US012264795B2

(12) United States Patent
Sanichar et al.

(10) Patent No.: US 12,264,795 B2
(45) Date of Patent: Apr. 1, 2025

(54) REFLECTOR AND REFLECTOR HOUSING FOR A LINEAR LIGHTING SYSTEM

(71) Applicant: AMERLUX LLC, Oakland, NJ (US)

(72) Inventors: Avinash Sanichar, Bloomfield, NJ (US); Alister Mallet, Bushkill, PA (US); Ernesto Buchana, Clifton, NJ (US)

(73) Assignee: AMERLUX, LLC, Oakland, NJ (US)

( * ) Notice: Subject to any disclaimer, the term of this patent is extended or adjusted under 35 U.S.C. 154(b) by 0 days.

(21) Appl. No.: 18/416,185

(22) Filed: Jan. 18, 2024

(65) Prior Publication Data

US 2024/0247770 A1 Jul. 25, 2024

Related U.S. Application Data

(60) Provisional application No. 63/480,740, filed on Jan. 20, 2023.

(51) Int. Cl.

*F21S 4/28* (2016.01)
*F21V 17/16* (2006.01)
*F21V 17/18* (2006.01)
*F21V 29/70* (2015.01)

(52) U.S. Cl.

CPC .............. *F21S 4/28* (2016.01); *F21V 17/164* (2013.01); *F21V 17/18* (2013.01); *F21V 29/70* (2015.01)

(58) Field of Classification Search

CPC ........... F21S 4/28; F21S 8/026; F21V 17/164; F21V 17/18; F21V 29/70; F21V 15/013; F21V 19/004; F21Y 2115/10

See application file for complete search history.

(56) References Cited

U.S. PATENT DOCUMENTS 8,556,451 B1 * 10/2013 Wilkinson ................ F21S 2/00 362/217.08
9,052,090 B1 * 6/2015 Laso ..................... F21V 19/003
10,274,173 B2 * 4/2019 Schubert ................. F21V 7/005
11,655,948 B2 * 5/2023 Parker ................... F21V 17/104 362/217.01
11,821,597 B1 * 11/2023 Irons ......................... F21S 4/28

(Continued)

FOREIGN PATENT DOCUMENTS

CN 110131619 A * 8/2019 ............... F21K 9/27
DE 102019000410 B4 * 12/2022 .............. F21S 8/066
WO WO-2020062343 A1 * 4/2020 ............... F21K 9/20

*Primary Examiner* — Zheng Song
*Assistant Examiner* — Glenn D Zimmerman
(74) *Attorney, Agent, or Firm* — DAY PITNEY LLP; George N. Chaclas; Anthony A. Kassas

(57) ABSTRACT

A lighting system including a housing defining a cavity. The housing has catches protruding into the cavity. The lighting system has a direct reflector positioned in the cavity that has a first and second branch. The first and second branches each have a finger extending from the branch at a branch intersection and bending at a finger joint, and a bent shank also extending from the branch intersection. The bent shank extends along a neck portion and bends at a shoulder to form a nook. The first and second branches are configured to snap into the catches of the housing between the finger joint and the shoulder of the bent shank. The lighting system also has a lens configured to snap into the nook of the bent shank, and an LED printed circuit board positioned between the branches.

19 Claims, 22 Drawing Sheets

(56) References Cited

U.S. PATENT DOCUMENTS

| | | | | |
|---|---|---|---|---|
| 2003/0156416 | A1* | 8/2003 | Stopa | F21S 43/15 362/373 |
| 2012/0201032 | A1* | 8/2012 | Holten | F21V 7/005 362/296.01 |
| 2013/0039052 | A1* | 2/2013 | Forteza | F21V 15/013 362/217.17 |
| 2014/0355272 | A1* | 12/2014 | Chou | F21S 4/28 29/592.1 |
| 2018/0051861 | A1* | 2/2018 | Dhillon | F21V 17/16 |
| 2020/0149715 | A1* | 5/2020 | Zeman | F21S 8/022 |

* cited by examiner

REFLECTOR AND REFLECTOR HOUSING FOR A LINEAR LIGHTING SYSTEM

CROSS REFERENCE TO RELATED APPLICATIONS

This application claims the benefit of U.S. Provisional Patent Application No. 63/480,740, filed on Jan. 20, 2023, which is incorporated by reference herein in its entirety for any purpose whatsoever.

FIELD OF THE DISCLOSURE

The subject disclosure relates to lighting systems, and more particularly to linear lighting systems having a housing, reflector, and lens configured for snap-in connection.

BACKGROUND

A linear lighting system refers to a type of lighting arrangement that is characterized by a long, straight form factor. It typically consists of linear light sources arranged in a row or linear pattern. Linear lighting systems play a crucial role in various applications, providing uniform illumination across diverse environments such as commercial spaces, residential areas, and industrial facilities.

Traditional linear lighting systems have relied on reflector designs that often involve complex sheet metal production processes. One significant challenge with these conventional systems is the need for precise hole patterns in the reflector and lighting housing, which poses manufacturing complexities and cost implications. Additionally, the integration of connectors or components in traditional systems often requires specialized form tooling, leading to increased production expenses and limitations in design flexibility.

The drawbacks associated with traditional linear lighting systems have sparked the need for innovative solutions to enhance efficiency, reduce production costs, and offer greater design flexibility. The linear lighting systems discussed herein aims to overcome the limitations of traditional designs by eliminating the need for specialized form tooling to accommodate connectors or components. This breakthrough not only simplifies the manufacturing process but also opens up possibilities for a more versatile and adaptable linear lighting system.

SUMMARY

In view of the above, a need exists for a lighting system with heightened lumen output with optimal reflective surfaces without creating undue bulk or complexity. A further need exists for an arrangement to amplify lumen output while maintaining flexibility in material usage, while simultaneously providing ease of assembly and manufacture.

The present disclosure is directed to a lighting system comprising including a housing defining a cavity. The housing has catches protruding into the cavity. A direct reflector is positioned in the cavity and has a first and second branch. The first and second branches each have a finger extending from the branch at a branch intersection and bending at a finger joint. The first and second branches also have a bent shank extending from the branch intersection. The bent shank extends along a neck portion and bends at a shoulder to form a nook. The first and second branches are configured to snap into the catches of the housing between the finger joint and the shoulder of the bent shank, while a lens is configured to snap into the nook of the bent shank. The lighting system also has an LED printed circuit board positioned between the branches. The snap in function of the reflector to the housing creates an efficient way to dissipate heat generated from the led board to transfer heat from the heat source thru the reflector to the housing's exterior surface.

Preferably, the lighting system also includes an indirect reflector connected to the housing. The lighting system may also have an electrical control system to convert line voltage into a requisite LED printed circuit board voltage. Preferably, a surface of the LED printed circuit board contacts the direct reflector and dissipates heat to the direct reflector. The reflector may be made of extruded acrylic, polycarbonate, or aluminum. If needed, the lens can be made of acrylic, polycarbonate, aluminum, ABS, Zinc, Nylon, etc.

Still another embodiment of the present disclosure includes a lighting system including a housing defining a cavity. A direct reflector is positioned in the cavity and connected to the housing. The direct reflector defines a screw channel, the screw channel having a base including an elongated slot. The lighting system has a lens connected to the direct reflector and an LED printed circuit board configured to slide into the elongated slot.

And yet, in another embodiment of the present disclosure, the LED printed circuit board is screwed to the direct reflector at an angle via the screw channel, urging the LED printed circuit board into the elongated slot. Preferably, an indirect reflector is connected to the housing. An electrical control system may be used to convert line voltage into a requisite LED printed circuit board voltage. A surface of the LED printed circuit board may contact the direct reflector and dissipate heat to the direct reflector. The direct reflector may be made of extruded acrylic, polycarbonate, or aluminum while the lens may be made of acrylic, polycarbonate, aluminum, ABS, Zinc, Nylon, etc.

The present disclosure also relates to a linear light fixture. The linear light fixture has a housing defining a cavity, the housing having catches protruding into the cavity. The linear light fixture also has an LED printed circuit board, and a direct reflector configured to snap into the catches of the housing. The direct reflector defines two elongated slots for sliding the LED printed circuit board into. The linear light fixture has a lens configured to snap into the direct reflector. The linear light fixture has an unlatch leaver affixed to the direct reflector and configured to pivot and consequently urge the direct reflector away from the housing catches to unsnap the direct reflector from the housing In some embodiments, the linear light fixture has an indirect reflector connected to the housing and linear control system to convert line voltage into a requisite LED printed circuit board voltage. A surface of the LED printed circuit board may contact the indirect or direct reflector and dissipates heat to the indirect or direct reflector. The indirect or direct reflector may be made of extruded acrylic, polycarbonate, or aluminum while the lens may be made of acrylic, polycarbonate, or aluminum.

It should be appreciated that the subject technology can be implemented and utilized in numerous ways, including without limitation as a process, an apparatus, a system, a device, a method for applications now known and later developed. These and other unique features of the system disclosed herein will become more readily apparent from the following description and the accompanying drawings.

BRIEF DESCRIPTION OF THE DRAWINGS

Various aspects of the present disclosure are discussed herein with reference to the accompanying Figures. It will be appreciated that for simplicity and clarity of illustration, elements shown in the drawings have not necessarily been drawn accurately or to scale. For example, the dimensions of some of the elements can be exaggerated relative to other elements for clarity or several physical components can be included in one functional block or element. Further, where considered appropriate, reference numerals can be repeated among the drawings to indicate corresponding or analogous elements. For purposes of clarity, however, not every component can be labeled in every drawing. The Figures are provided for the purposes of illustration and explanation and are not intended as a definition of the limits of the disclosure.

DETAILED DESCRIPTION

Figure 1:
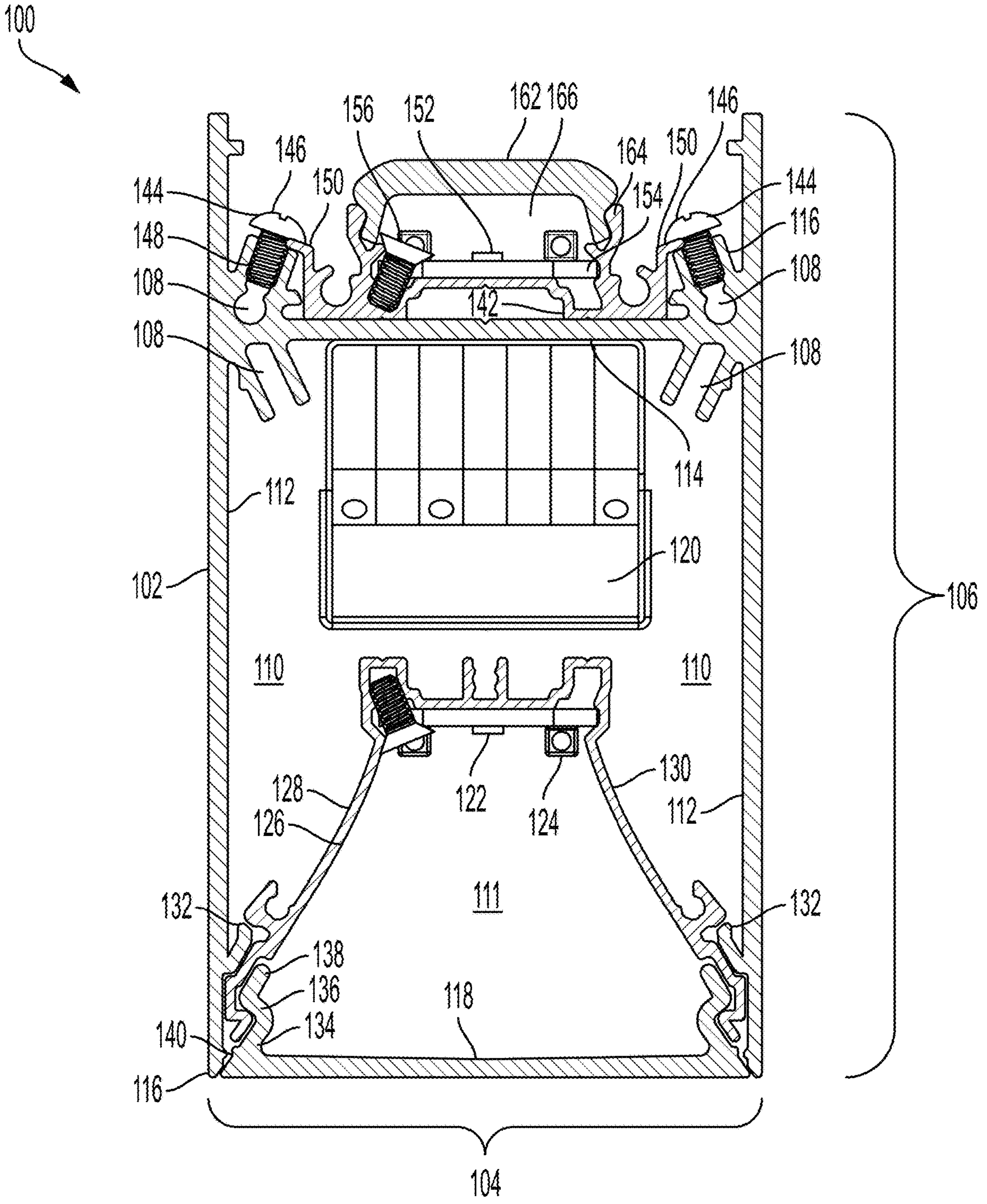
FIG. 1 is a cross-sectional view of a lighting system in accordance with the subject disclosure.

The subject technology overcomes many of the prior art problems associated with linear lighting systems. The advantages, and other features of the technology disclosed herein, will become more readily apparent to those having ordinary skill in the art from the following detailed description of certain exemplary embodiments taken in combination with the drawings and wherein like reference numerals identify similar structural elements. It should be noted that directional indications such as vertical, horizontal, upward, downward, right, left and the like, are used with respect to the figures and not meant in a limiting manner.

Referring now to FIG. 1, a cross-sectional view of a linear lighting system 100 is shown. The linear lighting system 100 as described herein is a linear shaped luminaire. This luminaire uses elongated optics to distribute light over a more narrow area compared to traditional lighting. Usually, the linear lighting system 100 is installed as either suspended from a ceiling, surface mounted to a wall or ceiling, or recessed into a wall or ceiling. Features, advantages, and principles taught by the description of linear lighting system 100 can also be used in alternative types of lighting fixtures and systems such as, for example, recessed lighting, track lighting and monorail, chandeliers, pendants, sconces, ceiling lights, floor and table lambs, and outdoor lighting.

The linear lighting system 100 includes a housing 102. As mentioned with reference to the description prior, the housing 102 has a linear shape, extending, for example, along a depth dimension extending into or out of the page of FIG. 1. The housing 102 is rectangular shaped, prolonging in a horizontal dimension 104 by roughly 2.0 inches, and a vertical dimension 106 by roughly 3.5 inches. Further, the housing 102 is composed of shrouded aluminum, though, the size, material, and overall design of the housing 102 can be varied based on concept or application. The housing 102 defines several screw bosses 108 to aid in the assembly of mounting parts by providing a channel for a screw 108.

The housing 102 defines a housing cavity 110 having a flat-bottomed, u-shape configuration formed by sidewalls 112 and an intersecting crossbar 114 extending between the sidewalls 112. The side walls 112 each have tapered ends 116 for configuration with a lens 118, explained in more detail below.

Situated in the housing 102 is an electrical control system 120. The electrical control system 120 is a linear regulator or driver which may exist in a packaged integrated circuit. The control system 120 requires a rectified voltage source, e.g., a bridge rectifier to rectify an alternating current voltage to generate a low voltage, direct current serving as a driving voltage of the lighting system 100. Thus, the electrical control system 120 is a current regulator, converting line voltage into a requisite printed circuit board voltage utilized by an LED printed circuit board 122 situated in the housing cavity 110. The electrical control system 120 connects to the LED printed circuit board 122 via contact leads 124.

The LED printed circuit board 122 is used to mount diodes and power LEDs to project into an optical cavity 111 of the linear lighting system 100. Because these LEDs and their operation generate a large amount of heat, the LED printed circuit board 122 may include a heat sink (not distinctly shown) or structural material that draws away heat. Hence, the LED printed circuit board 122 may be made of aluminum material, which excels at transferring heat away from the board and assisting in thermal management, or fiberglass. Over a base aluminum or fiberglass layer is a dielectric layer, topped by a copper circuit layer and a solder mask.

Figure 2:
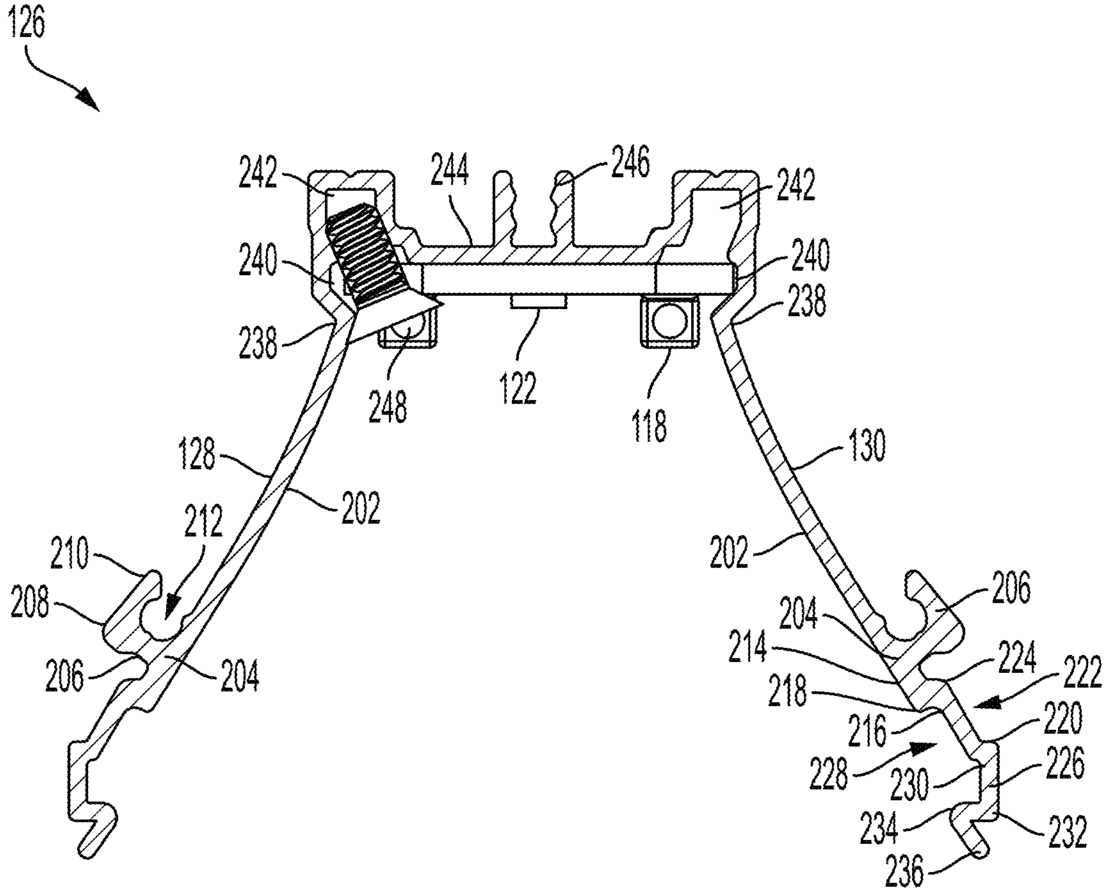
FIG. 2 is an isolated, cross-sectional view of a direct reflector and LED printed circuit board employed in the lighting systems of FIG. 1.
Figure 3A:
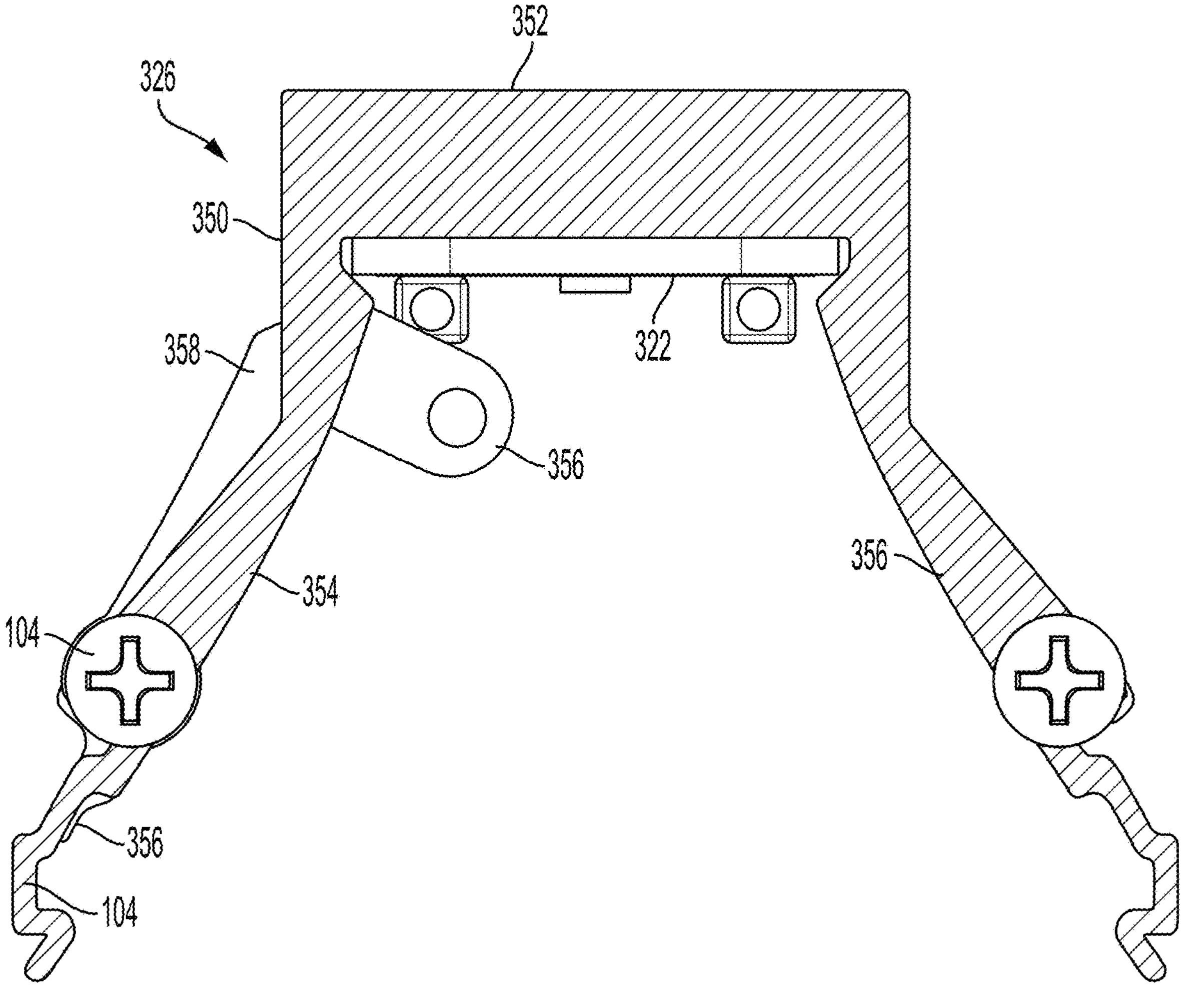
FIG. 3A is an isolated, cross-sectional view of an unlatch leaver for attaching and dissociating a director reflector to a housing of a lighting system in accordance with the subject disclosure.
Figure 3B:
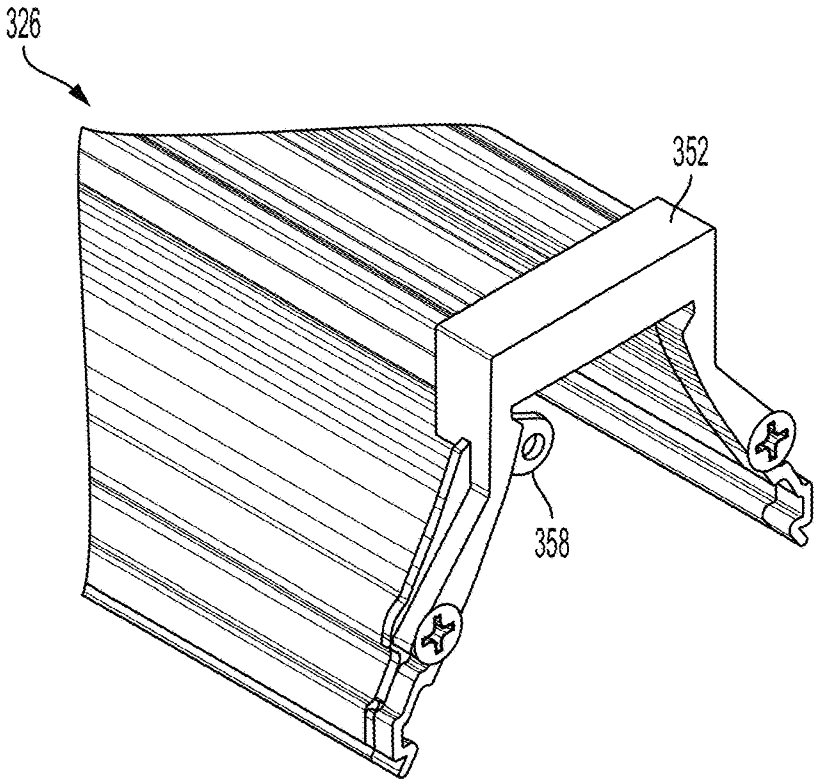
FIGS. 3B-3D are perspective views of the unlatch leaver of FIG. 3A affixed to a direct reflector in accordance with the subject disclosure.
Figure 3C:
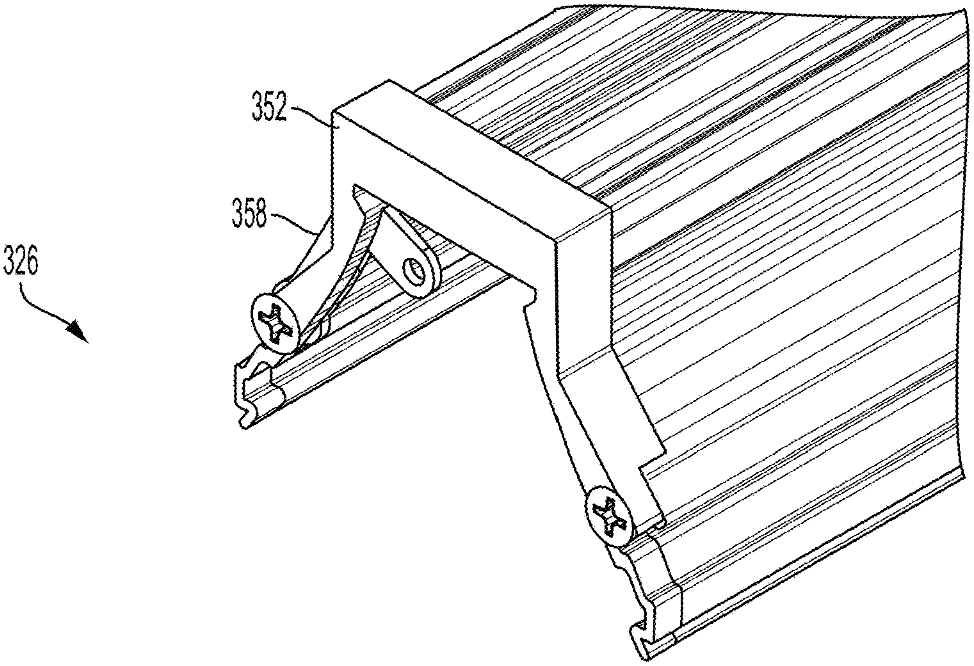
Figure 3D:
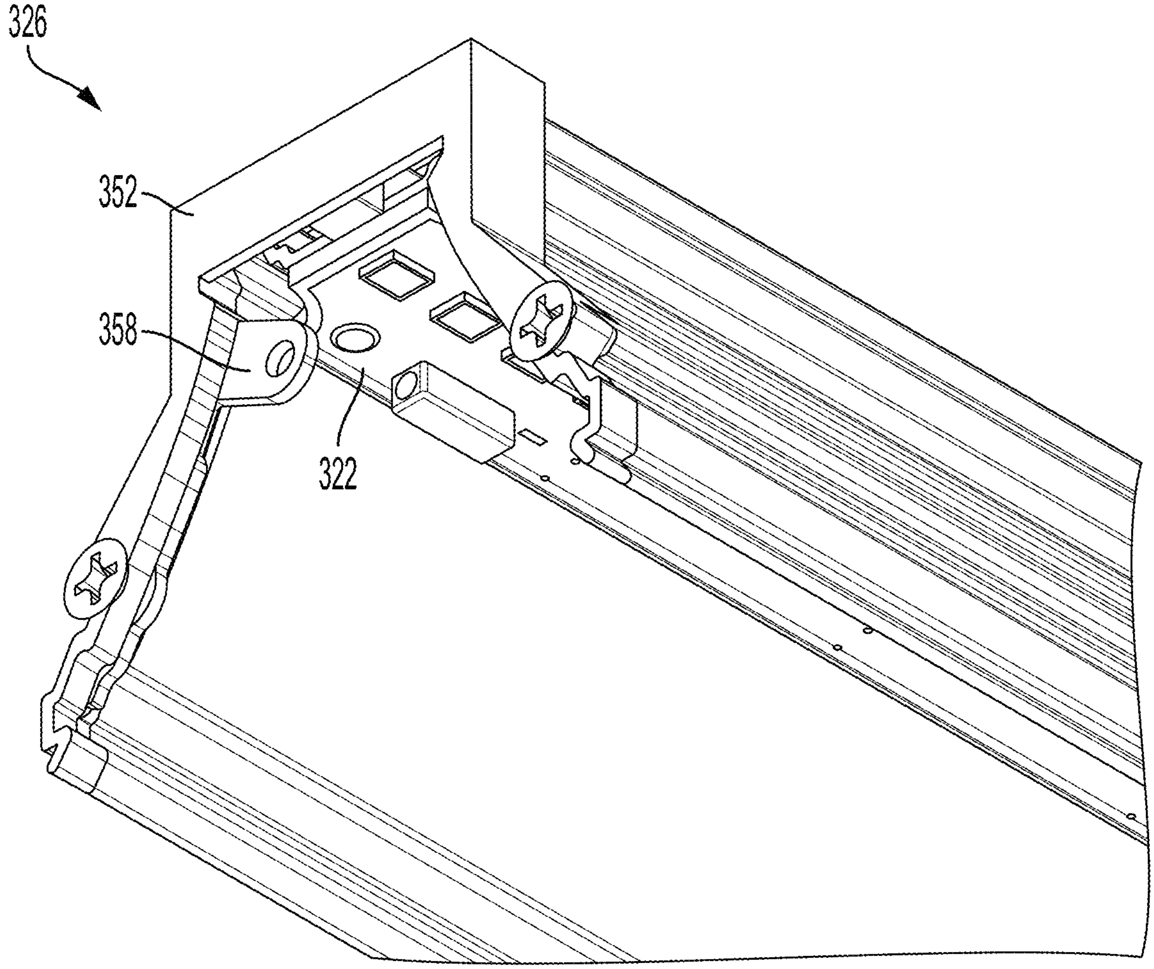

Referring now to FIGS. 1 and 2 together, also situated in the housing cavity 110 is a direct reflector 126 made of extruded acrylic, polycarbonate, and/or aluminum. The direct reflector 126 serves to guide light expelled from the LED printed circuit board 122 to a lighting target, forming the optical cavity 111. The direct reflector 126 has a first and second branch 128, 130 extending outwardly, each congruently sized and shaped.

Referring only to FIG. 2, each of the first and second branches 128, 130 includes a main column 202 proliferating at a 240 or 300 degree angle relative to the crossbar 114 of the housing 102 upon installation thereto. Each main column 202 defines a branch intersection 204 from which a finger 206 projects relatively perpendicular. Each finger 206 thereafter bends roughly 90 to 120 degrees at a finger joint 208, extending to roughly a 60 or 120 degree angle, respectively, relative to the crossbar 114 of the housing 102 when installed. Each finger 208 terminates thereafter at a barb 210. The angle formed between an extension of the barb 210 and the main column 202 forms a groove 212 serving as a screw boss in some embodiments.

Also extending from the branch intersection 204 is a bent shank 214, substantially in line with the proliferation of the main column 202 of the first and second branches 128, 130. The bent shank 214 staggers following the branch intersection 204 to a neck portion 216 via a shank fork 218, the shank fork 218 generally offsetting the shape of the bent shank 214 outwardly. Nonetheless, the neck portion 216 of the bent shank 214 follows the relative trajectory of the main column 202 to a shoulder 220. The finger joint 208, the neck portion 216, and shoulder 220, form a connection hollow 222 provided by an outward facing surface 224 of the first and second branches 128, 130. From the shoulder 220 projects a chute 226 at an angle of roughly 45 degrees offset from the direction of the main column 202 or the neck portion 216. The shoulder 220, chute 226, and neck portion 216 form a nook 228 due to the arrangement between these component parts of the bent shank 214. The nook 228 is provided by an inward facing surface 230 of the first and second branches 128, 130.

The chute 226 thereafter bends at a right angle at a chute joint 232. The bent shank 214 extends perpendicular to the chute 226 until reaching a bent shank knee 234. Following the bent shank knee 234, the bent shank 214 finally terminates at a bent shank foot 236 which extends relatively parallel to the main column 202 and neck portion 216 of the respective branch 128, 130.

Still referring to FIG. 2, in an opposite direction of the branch intersection 204, each branch 128, 130 tapers inwardly along the 60 degree and 120 degree angle described previously, relative to the crossbar 114 of the housing 102 upon installation. Each branch 128, 130 eventually rotates outward opposite their respective inward taper to form outwardly facing divots 238 in the outward facing surface 224 of the branches 128, 130, and back inward to form elongated slots 240 in the inward facing surface 230. From the elongated slots 230, each branch 128, 130 defines a screw channel 242. Thus, the base of each screw channel 242 includes the elongated slots 240.

The branches 128, 130 meet at a bridge 244, located at the top of the direct reflector 126. Thus, the screw channels 242 are disposed between the elongated slots 240 and the bridge 244. The bridge 244 further defines an additional screw boss 246 for connection of constituent parts to the direct reflector 126.

As detailed by FIG. 2, the LED printed circuit board 122 slides into the elongated slots 240, that is, into and out of the page of FIG. 2. Thus, the direct reflector 126 houses and encapsulates edges of the LED printed circuit board 122. A flat headed screw 248 can be driven through the LED printed circuit board 122 into one of the screw channels 242 at an angle, further urging the LED printed circuit board 122 into the elongated slot 240. Additionally, the elongated slots 240 and the flat headed screw 248 urge the LED printed circuit board 122 against the bridge 244 of the direct reflector 126. The LED printed circuit board 122 thus dissipates heat generated therefrom via conduction to the bridge 244 and consequently the direct reflector 126 as a whole. The direct reflector 126 can dissipate heat to the housing 102.

Referring now specifically to FIGS. 1 and 2 together, the housing 102 has catches 132 protruding from the sidewalls 112 into the housing cavity 110. The catches 132 are secured to the sidewalls 112 or integrally formed therewith, each catch 132 forming an upstanding, slightly curved, hook shape for attachment thereto. The direct reflector 126 is shaped and configured to connect and snap around the catches 132 via the connection hollow 212 formed by the finger joint 208, the neck portion 216, and shoulder 220 of the direct reflector 126 as mentioned prior. In this regard, the direct reflector 126 is easily removable from the housing 102, further simplifying the complexity associated with state of the art technology.

The lens 118 of the linear lighting system 100 extends relatively horizontally, though may contain concave or convex curvature for light amplification exiting the optical cavity 111. The lens 118 has upstanding lens arms 134 integrally formed with the lens 112 and that extend therefrom at a 60 or 120 degree angle. Each lens arm 134 lengthens and subsequently bends at a lens elbow 136. The lens 118, thereafter defines a lens finger 138 relatively parallel to the lens arm 134 but staggered therefrom due to the lens elbow 136. The lens finger 138 is shaped and configured to connect and snap into the bent shank 214 of the direct reflector 126 via the nook 228 formed by the shoulder 220, chute 226, and neck portion 216. Upon connection of the direct reflector 126 and the lens 118, the bent shank knee 234 coincides with the lens elbow 136, snuggly fitting proximate to each other. Similarly, the bent shank foot 236 coincides with the lens arm 134. The lens 118 has tapered ends 140 which coincide with the tapered ends of the housing 116.

Referring now to FIGS. 3A-3D, a cross-sectional view of a direct reflector 326 is shown, the direct reflector 326 having a similar size and shape to the direct reflector 126 of FIGS. 1-2. The difference between the embodiment of FIGS. 1-2 and the embodiment shown in FIGS. 3A-3D is that the director reflector 326 of FIGS. 3A-3D employs a direct reflector end cap 350 screwed to the groove (not distinctly shown, but similar to element 212 in FIG. 2) of the direct reflector 326. As mentioned prior, the groove 212 of the direct reflector 126 shown in FIGS. 1-2 is formed by the extension of the barb 210 and the main column 202, and serves as a screw boss. The same applies for the embodiment shown in FIGS. 3A-3D.

The direct reflector end cap 350 has an end cap head 352 and first and second end cap branches 354, 356, mimicking the shape of the direct reflector 326. The direct reflector end cap head 352 houses lead wires and the like running from the electrical control unit (not distinctly shown, but similar to element 120 in FIG. 1) to the LED printed circuit board 322. The direct reflector end cap 350 also functions to aid in the snap in configuration of the direct reflector 326. In this regard, the direct reflector end cap 350 employs an unlatch leaver 358 pivotably screwed to the groove.

Figure 4A:
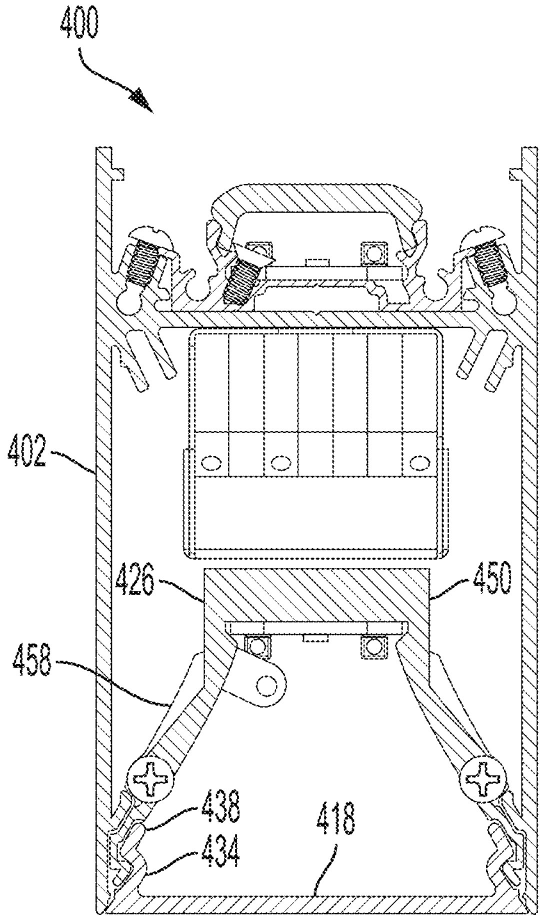
FIGS. 4A-4F are cross-sectional views of the unlatch leaver of FIGS. 3A-3D in operation, disconnecting the director reflector from the housing of the lighting system.
Figure 4B:
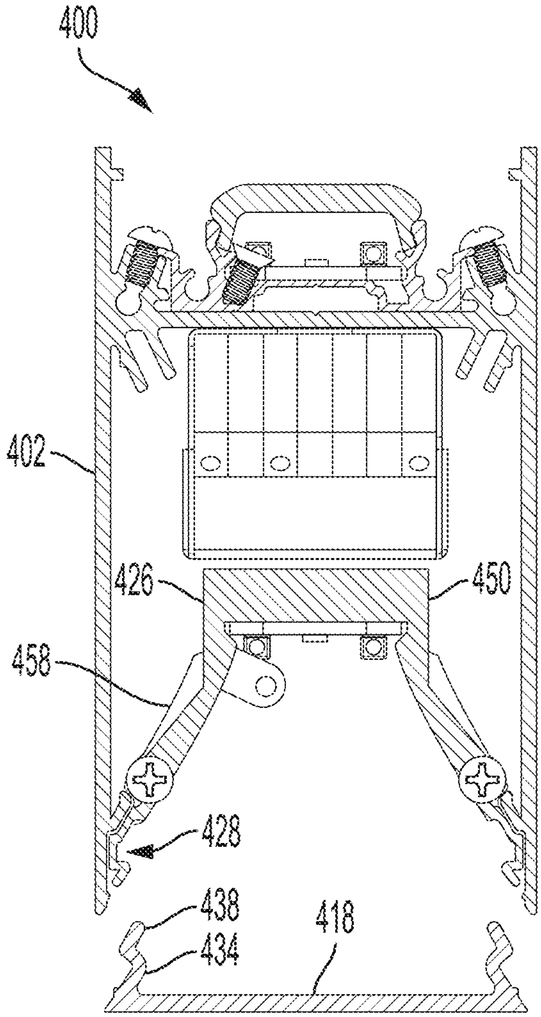
Figure 4C:
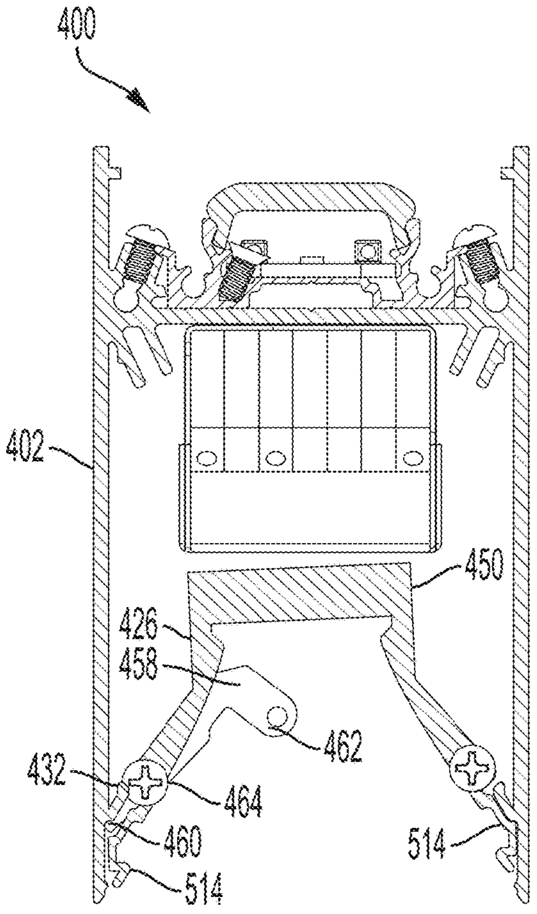
Figure 4D:
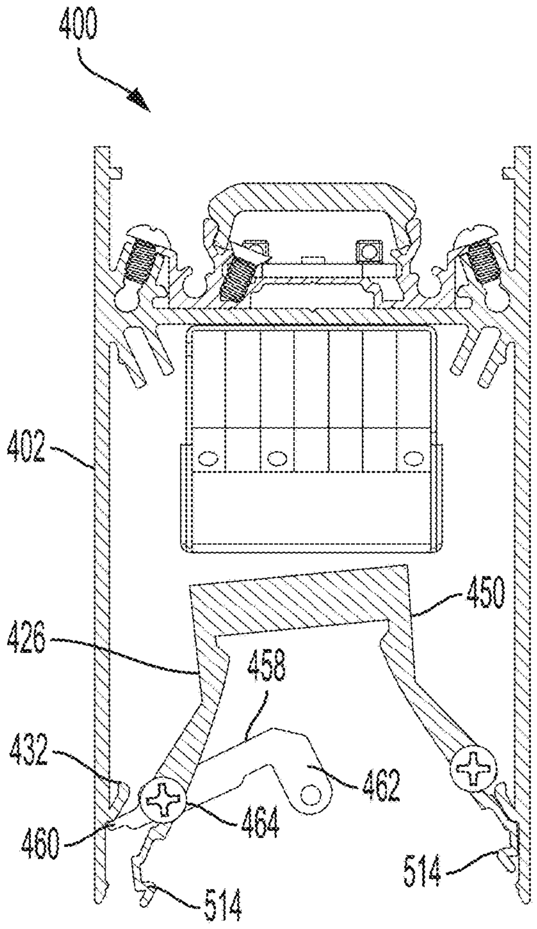
Figure 4E:
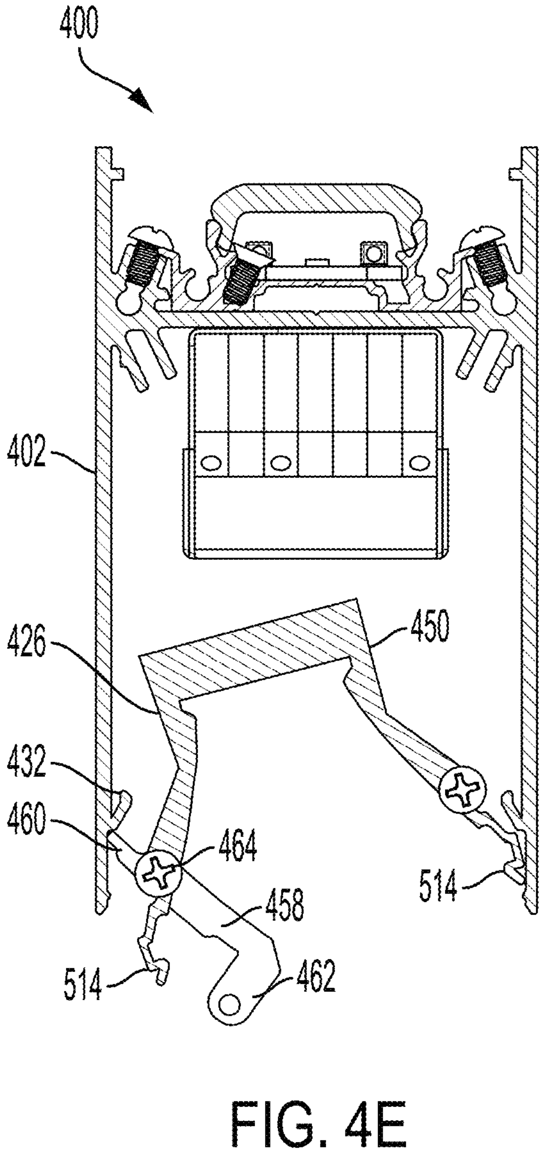
Figure 4F:
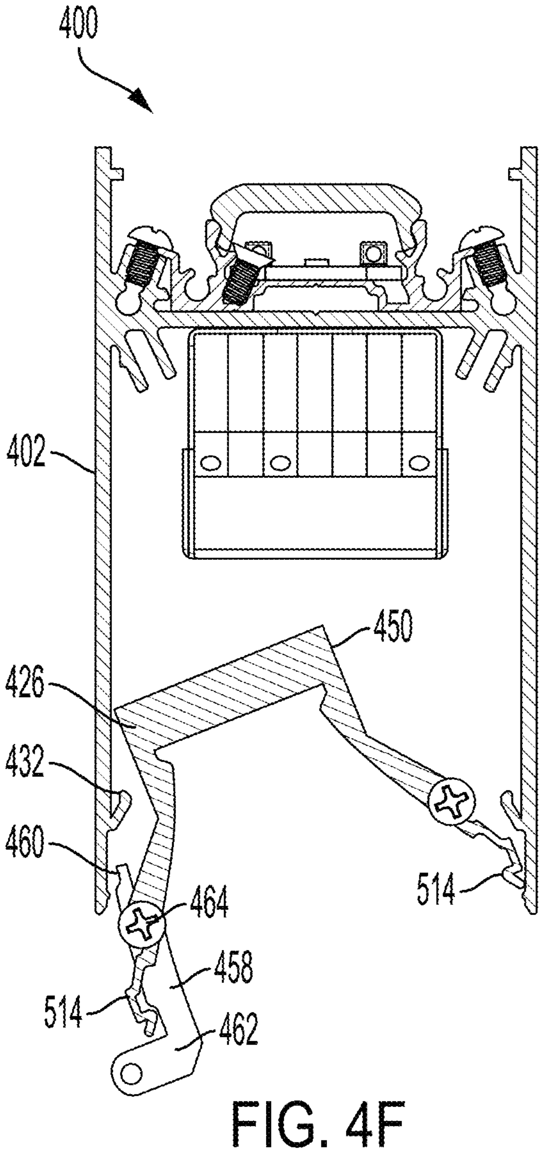

Referring specifically to FIGS. 4A-4F, cross-sectional views of a linear lighting system 400 show a sequential progression of the snap in configuration between the housing 402, the direct reflector 426, and the lens 418 using the unlatch leaver 458 of the direct reflector end cap 450. In FIGS. 4A and 4B, the lens 418 is disassociated from the direct reflector 426 via elastic deformation of the lens 418 and/or the direct reflector 426. The upstanding lens arms 434 may be pinched to retract the lens fingers 438 from the nook 428 formed by the direct reflector 426.

In FIGS. 4C-4F, a proximal end 460 of the unlatch leaver 458 abuts a catch 432 of the housing 402. A distal end 462 of the unlatch leaver 458 is thereafter forced or pulled downward roughly 90 to 180 degrees relative to a pivot point 464, the pivot point 464 being an affixation point between the unlatch leaver 458 and the direct reflector end cap 350. In turn, because the unlatch leaver 458 pivots in the groove (not distinctly shown, but similar to element 212 in FIG. 2) of the direct reflector 426, the proximal end 460 of the unlatch leaver 458 urged against the catch 432 of the housing 402 and disassociates the direct reflector 426 from the housing 402. By this action, the direct reflector 426 elastically deforms via one or both of the bent shanks 514, and releases from the housing 402.

Figure 5:
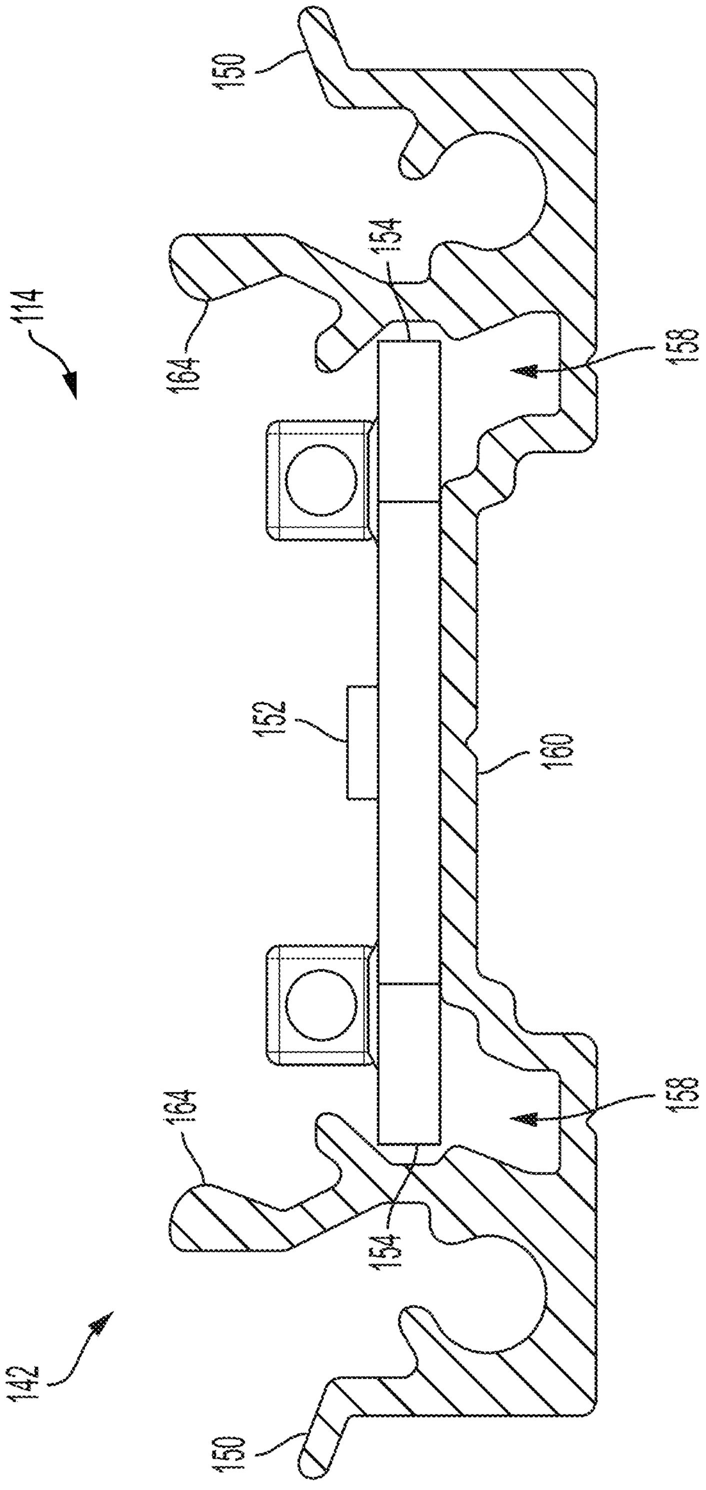
FIG. 5 is an isolated, cross-sectional view of an indirect reflector and LED printed circuit board employed in the lighting systems of FIG. 1.

Referring now to FIGS. 1 and 5 together, cross sectional views of an indirect reflector 142 are shown. The indirect reflector 142 allows linear lighting systems 100, 400 to project light away from a desired illumination location, i.e., not directly onto a subject. Thus, the desired illumination location is projected with indirect light from the indirect reflector 142. In this regard, light is collected by the indirect reflector 142 and reflected onto a subject in smooth, even rays, eliminating hotspot rays. The indirect reflector 142 is made of extruded acrylic, polycarbonate, and/or aluminum.

In FIG. 1, two round-head screws 144 are affixed to screw bosses 108, each head 146 of the round-head screws 144 wedging the indirect reflector 142 against the screw boss side wall 148 via indirect reflector flanges 150. In turn, the indirect reflector 142 is pressed against the housing crossbar 114, and fits snug in between two screw bosses 108.

In both FIGS. 1 and 5, and similar to the direct reflector 126, 226, 326, 426, a LED printed circuit board 152 slides into elongated slots 154 formed by the indirect reflector 142, that is, into and out of the page of FIGS. 1 and 5. Thus, the indirect reflector 142 houses and encapsulates edges of the LED printed circuit board 152. A flat headed screw 156 is driven through the LED printed circuit board 152 at an angle into a screw channel 158 defined by the indirect reflector 142, further urging the LED printed circuit board 152 into the elongated slot 154. Additionally, the elongated slots 154 and the flat headed screw 156 urge the LED printed circuit board 152 against a bridge 160 of the indirect reflector 142. The LED printed circuit board 152 thus dissipates heat generated therefrom via conduction to the bridge 160 and consequently the indirect reflector 142 as a whole. The indirect reflector 142 can dissipate heat to the housing 102.

An indirect lens 162 snaps into upstanding posts 164 of the indirect reflector 142 by elastic deformation of the indirect lens 162 and/or the upstanding posts 164. The indirect lens 162 can disassociate from the indirect reflector 142 via a pinching force applied to either the upstanding posts 164 or the indirect lens 162 to release indirect lens fingers 166 from the grip of the rigid upstanding posts 164.

Figure 6A:
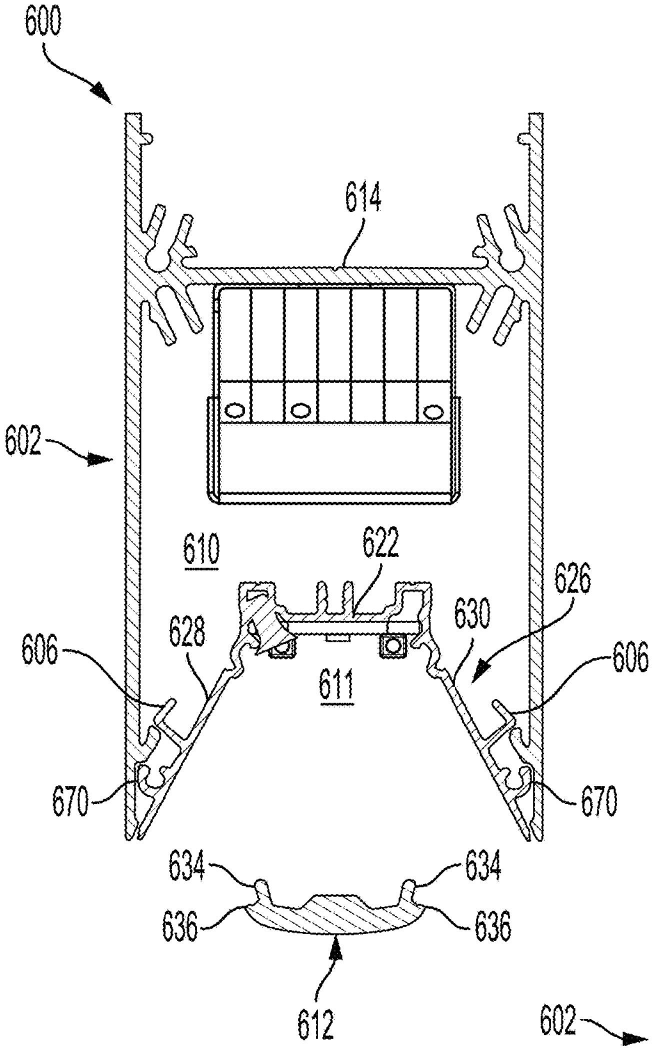
FIGS. 6A-6B show cross-sectional views of a second embodiment of the lighting system in accordance with the subject disclosure.
Figure 6B:
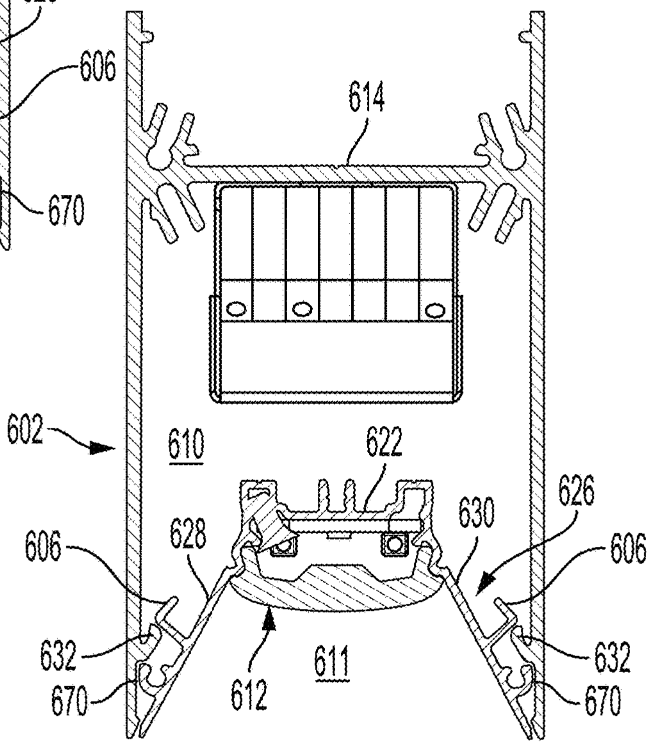
Figure 7:
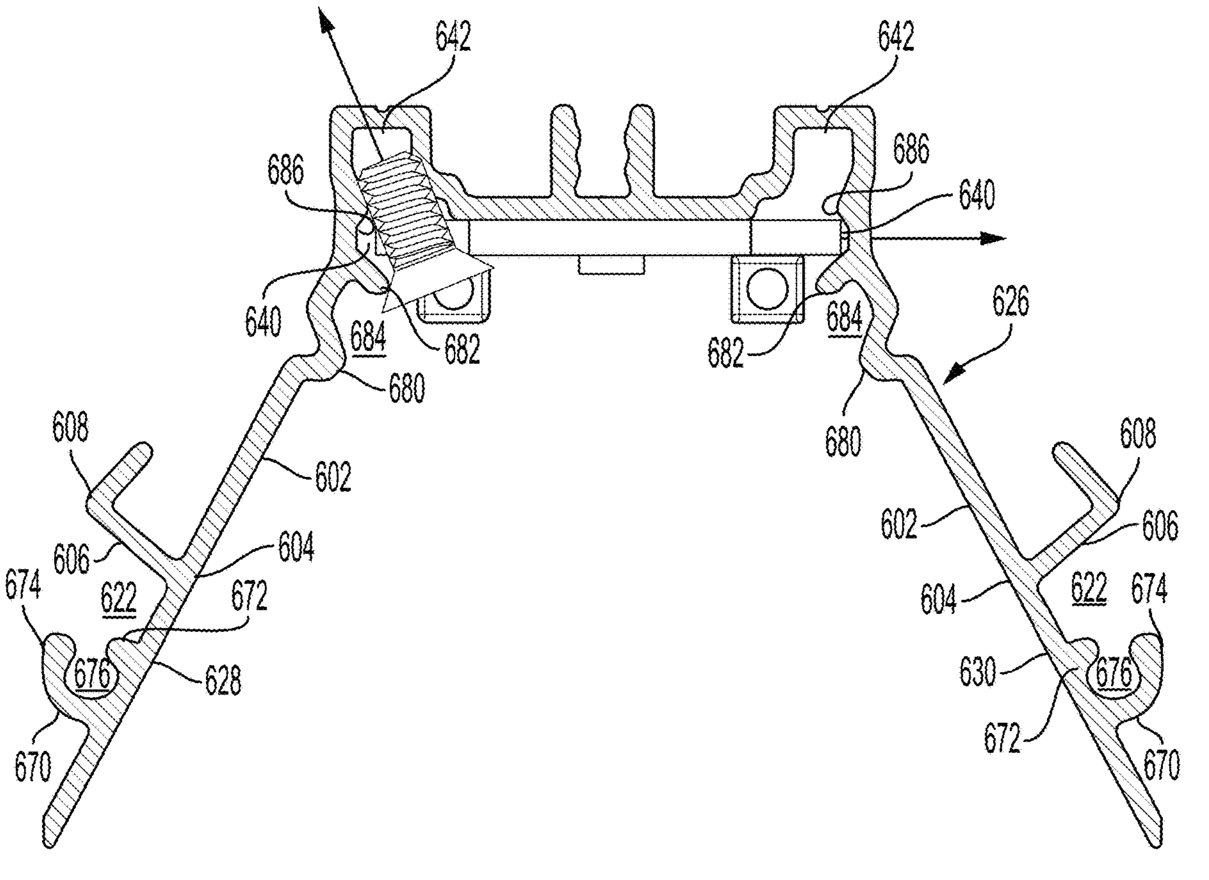
FIG. 7 is an isolated, cross-sectional view of a direct reflector and LED printed circuit board employed in the lighting systems of FIGS. 6A-6B.

Referring now to FIGS. 6A-7, a second embodiment of the direct reflector 626 is shown. The direct reflector 626 differs from the aforementioned direct reflector 126 of FIGS. 1-5 in shape and with regard to the connection location with a lens. With this in mind, direct reflector 626 serves to guide light expelled from the LED printed circuit board 622 to a lighting target, forming the optical cavity 611. The direct reflector 626 has a first and second branch 628, 630 extending outwardly, each congruently sized and shaped.

Each of the first and second branches 628, 630 includes a main column 602 proliferating at a 240 or 300 degree angle relative to the crossbar 614 of the housing 602 upon installation thereto. Each main column 602 defines a branch intersection 604 from which a finger 606 projects relatively perpendicular. Each finger 606 thereafter bends roughly 90 degrees at a finger joint 608, and extends straight along a 60 or 120 degree angle such that each finger 606 almost coincides in direction with the proliferating first and second branches 628, 630 respectively. The finger 606 is configured to sit or slide onto the catches 632 of the housing 602.

Each main column 602 continues along the respective 240 or 300 degree angle proliferation after the branch intersection 604. In this embodiment of the direct reflector 626, the main column 602 remains relatively straight throughout its length and does not terminate in a bent shank. Though, attached or integrally formed with the main column 602 is a saddle hook 670.

The saddle hook 670 embodies a u-shape, having a simple closed curve structure and overlapping in shape with the main column 602. With this said, the saddle hook 670 includes a proximate arm 672 and a distal arm 674 connected by a continuous transition therebetween. The angle formed between the proximate arm 672 and a distal arm 674 defines a groove 676 serving as a screw boss in some embodiments. Further, the finger 606, proximate arm 672, and distal arm 674 also form a connection hollow 622. Because the finger 606 is configured to sit or slide onto the catches 632 of the housing 602, and due to the location of the proximate arm 672 and distal arm 674 relative to the finger 606 along the main column 602, the catches 632 of the housing 602 can snap connect into the connection hollow 622, linking the direct reflector 626 to the housing 602.

Still referring to FIGS. 6A-7, in an opposite direction of the branch intersection 604, each branch 628, 630 tapers inwardly along the 60 degree and 120 degree angle described previously, relative to the crossbar 614 of the housing 602 upon installation. Each branch 628, 630 turns sharply inward and back outward to define a handle 680. Each branch 628, 630 thereafter proceeds along the normal 60 degree and 120 degree angle upon reaching a jutting inward leg 682. The handle 680 and jutting inward leg 682 together form a lens receiving niche 684.

Past the jutting inward leg 682, each branch 628, 630 forms elongated slots 640 in the inward facing surface 686. From the elongated slots 630, each branch 628, 630 defines a screw channel 642. Thus, the base of each screw channel 642 and the jutting inward leg 682 partially encloses the elongated slots 640. The remaining portion of the direct reflector 626 mimics that of the direct reflector described with reference to FIGS. 1-5.

Referring just to FIGS. 6A-6B, the lens 618 of linear lighting system 600 contains a convex curvature for light amplification exiting the optical cavity 611. The lens 618 has left and right ridges 636 and upstanding lens arms 634 integrally formed with the lens 612 that extend therefrom at a 60 or 120 degree angle. The shape of the left and right ridges 636 and upstanding lens arms 634 are shaped and configured to connect and snap into the lens receiving niche 684 of the direct reflector 626. Upon connection of the direct reflector 626 and the lens 618, the left and right ridges 636 and upstanding lens arms 634 coincide with the handle 680 and jutting inward leg 682, snuggly fitting proximate to each other.

Figure 8:
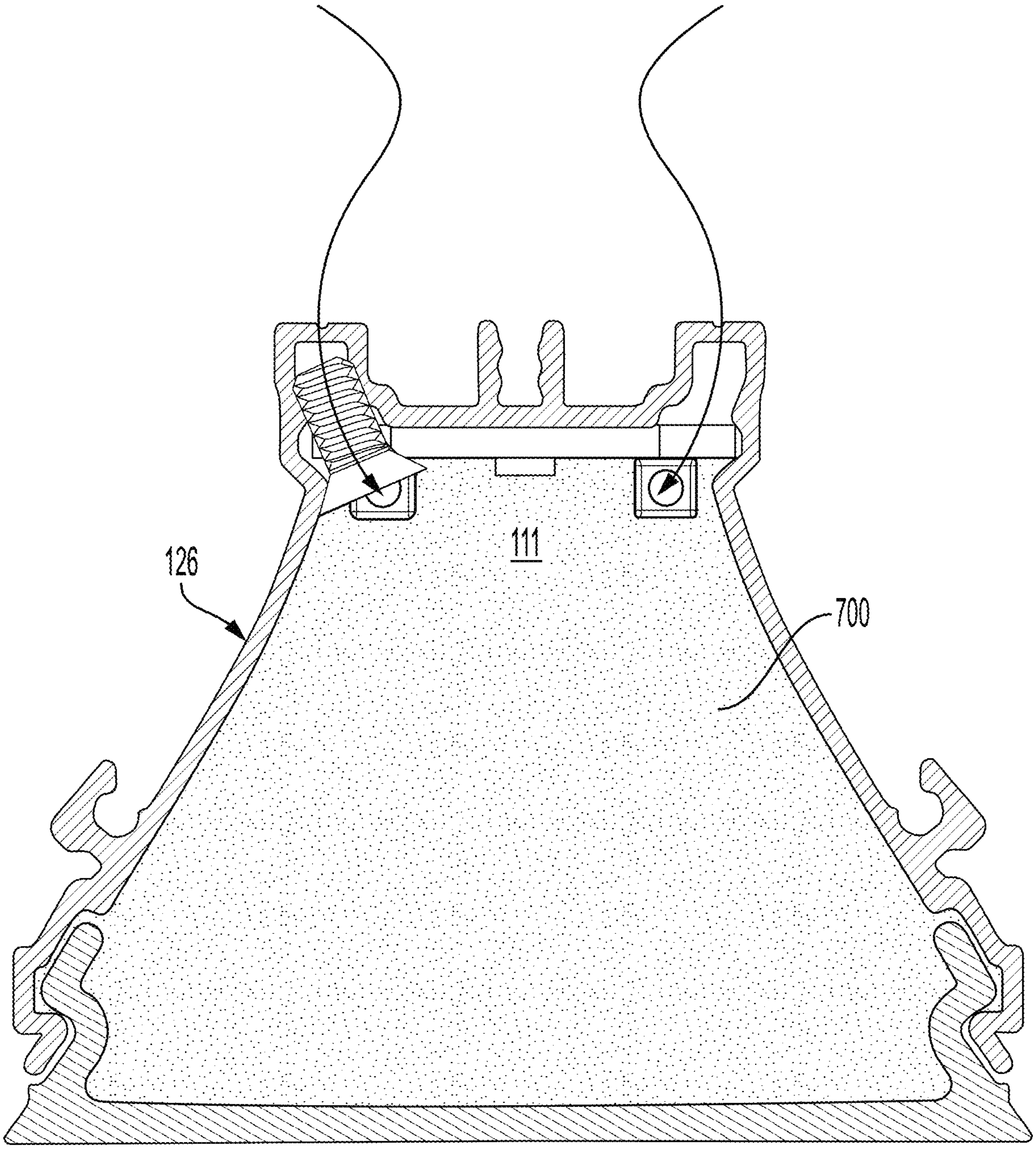
FIG. 8 is an isolated, cross-sectional view of a direct reflector and LED printed circuit board adapted for outdoor use.

FIG. 8 shows an embodiments of direct reflector 126 described herein, yet adapted for outdoor use. In this context, the optical cavities 110 of the subject direct reflector 126 is filled with encapsulate 700. The types of encapsulation material 700 varies based on application. For instance, silicone is known for its excellent resistance to extreme temperatures, UV radiation, and moisture while providing flexibility, allowing for thermal expansion and contraction without compromising a seal. Epoxy resin is a durable and chemically resistant material that provides a strong protective barrier while further being often transparent, allowing for visual inspection of internal components. Polyurethane is a versatile material that offers good resistance to moisture, chemicals, and UV exposure, providing a tough protective coating while maintaining flexibility. Acrylic encapsulation provides a clear protective layer that is resistant to yellowing and UV damage, and often used when visibility of internal components is desired. Among many other alternatives, gel encapsulation involves using a soft, clear gel that provides protection against moisture and vibrations, while allowing easy inspection and maintenance.

Referring now to FIGS. 9-12C, a further application of the linear lighting system principles detailed above is characterized. The embodiments of FIGS. 9-12C still define a housing 1102 with snap-in configuration. However, instead of utilizing a direct reflector 126, 626 as in previous cases, linear lighting system 1100 employs a housing adapter 1126. The housing adapter 1126 is shaped and configured to connect and snap around the catches 1132 of the housing 1102, as described above with reference to the direct reflector 126, 626. In this regard, the housing adapter 1126 is easily removable from the housing 1102, further simplifying the complexity associated with state of the art technology.

Figure 12A:
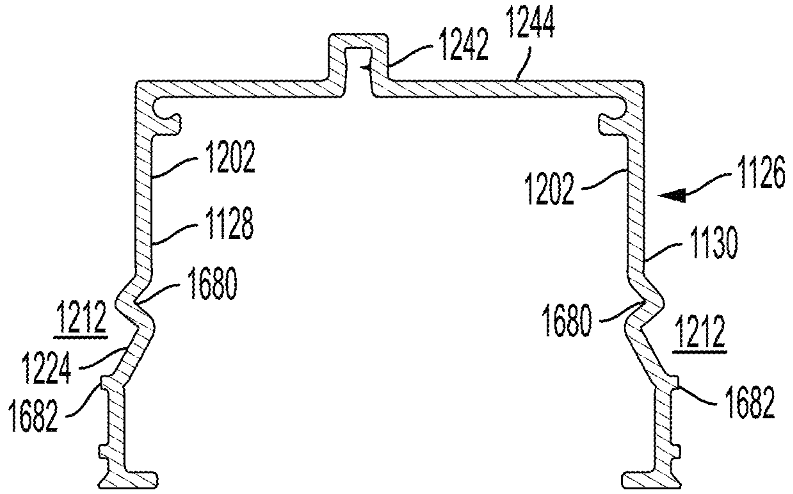
FIG. 12A-12C show isolated, cross-sectional views of the housing adapter of FIGS. 9-11.
Figure 12B:
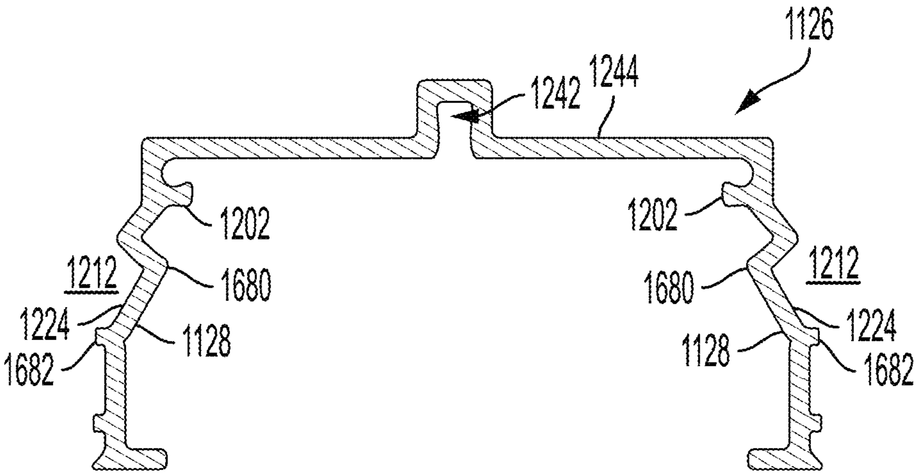

Each of the housing adapters 1126 depicted in FIGS. 12A-12B have first and second branches 1128, 1130 including a main column 1202 proliferating downward relative to the crossbar 1114 of the housing 1102 upon installation thereto. The housing adapter 1126 depicted in FIG. 12C however proliferates upward relative to the crossbar 1114 of the housing 1102 upon installation thereto. Without expressly detailing the exact shape and formation of each housing adapter 1126 which can vary from application to application, it's worth noting that all of the first and second branches 1128, 1130 of each housing adapter 1126 defines a handle 1680 and a jutting outward leg 1682. Together, the handle 1680 and a jutting outward leg 1682 form an external surface connection hollow 1212 provided by an outward facing surface 1224 of the first and second branches 1128, 1130 for snap-in connection to the housing 1102.

Figure 9:
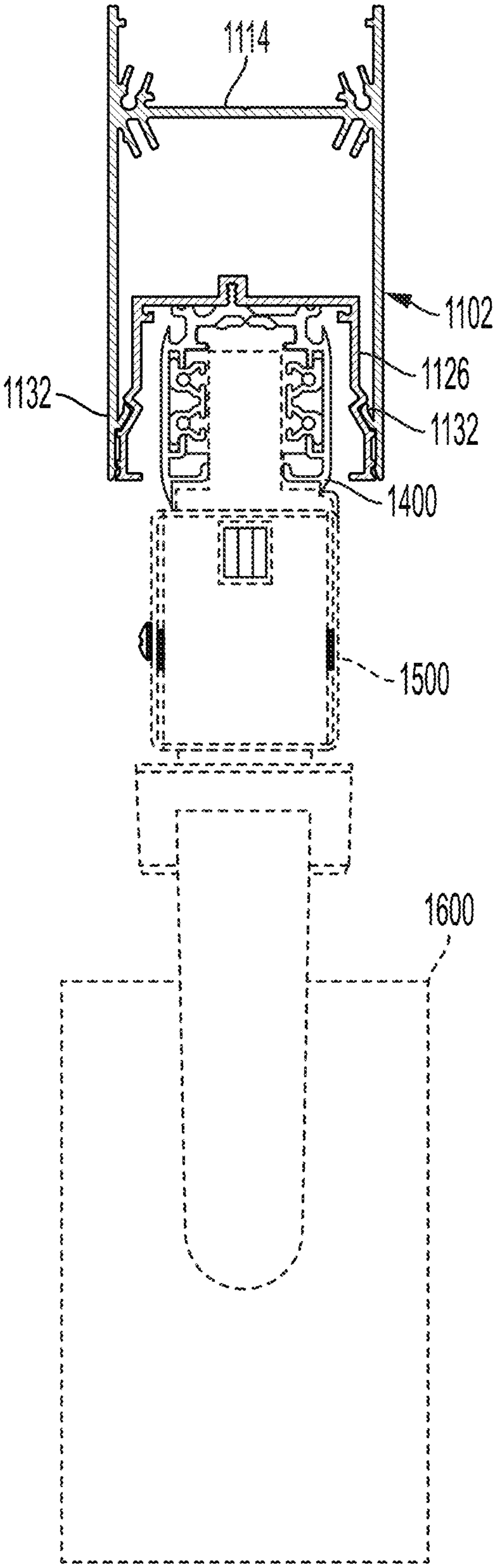
FIGS. 9-11 show cross-sectional views of an embodiment of the lighting system in accordance with the subject disclosure, utilizing a housing adapter to connect to lighting fixtures.
Figure 10:
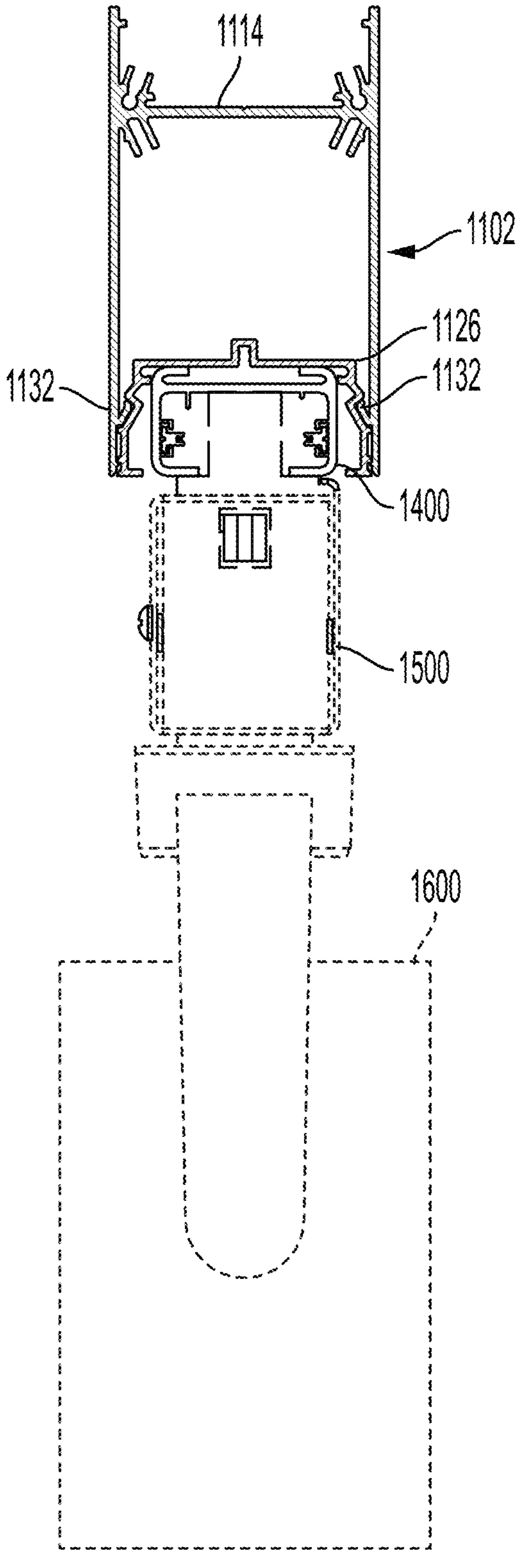

The branches 1128, 1130 of each of the housing adapters 1126 depicted in FIGS. 12A-12B meet at a bridge 1244, located at the top of the housing adapter 1126. Each bridge 1244 has a screw channel 1242 disposed relatively central between the branches 1128, 1130 for connection of constituent parts to the housing adapters 1126. In the embodiments of FIGS. 9-10, the referenced screw channel 1242 enables connection between the housing adapter 1126 to a housing track 1400, from which a track fixture 1500, and further a lighting fixture 1600 can be installed from.

Figure 11:
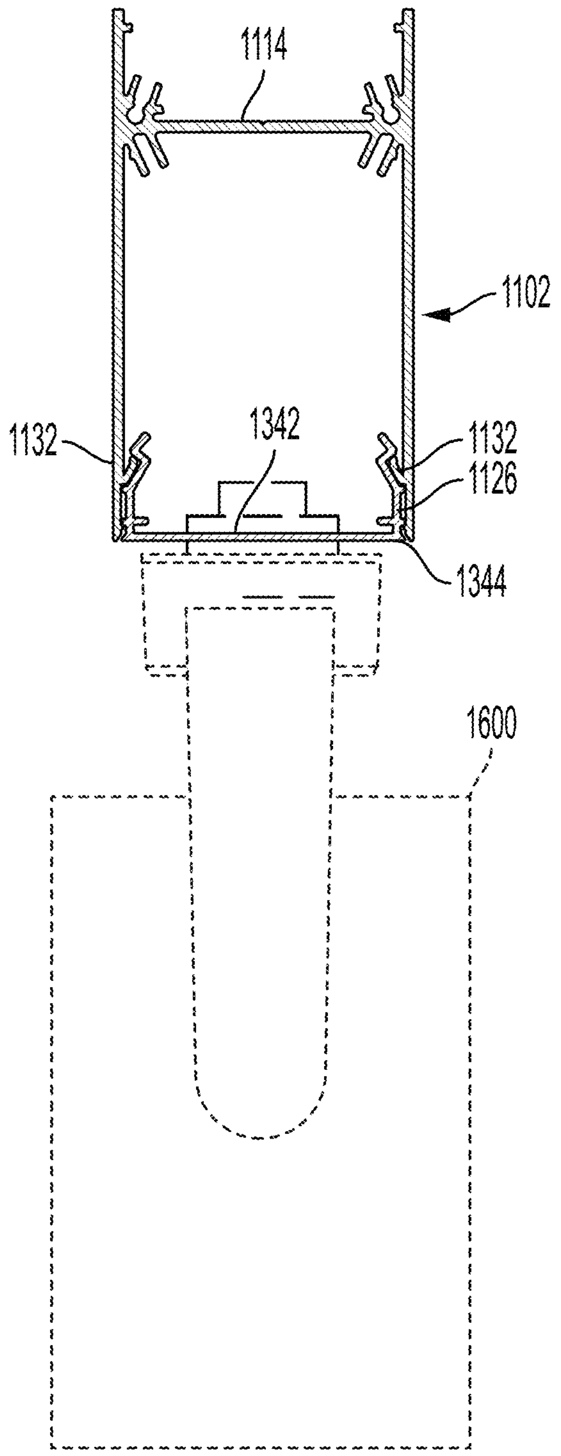
Figure 12C:
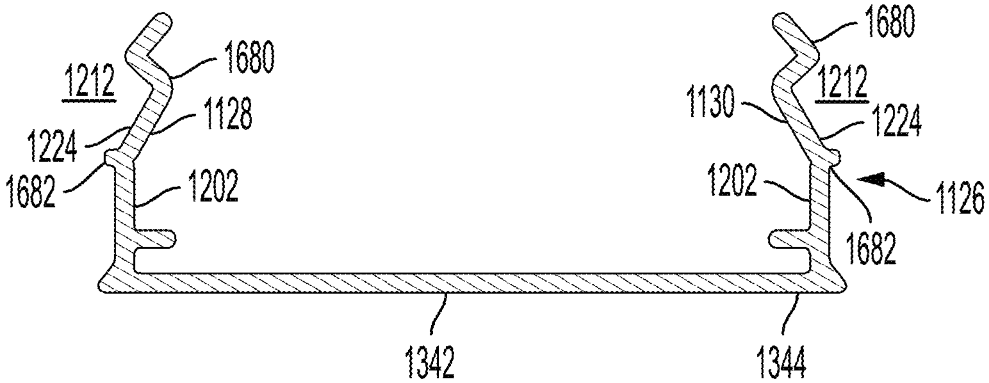

With reference to the housing adapter 1126 depicted in FIG. 12C, the housing adapter 1126 alternatively defines a blank cover 1344. The blank cover 1344 still snaps into the housing 1102. Instead of a screw channel, the blank cover 1344 employs a rectilinear supporting structure 1342 disposed parallel to the cross bar 1114 of the housing 1102 upon installation. The supporting structure 1342 employed in FIG. 11 is configured to harness a lighting fixture 1600 directly without the need for a housing track 1400 or a track fixture 1500.

Figure 13:
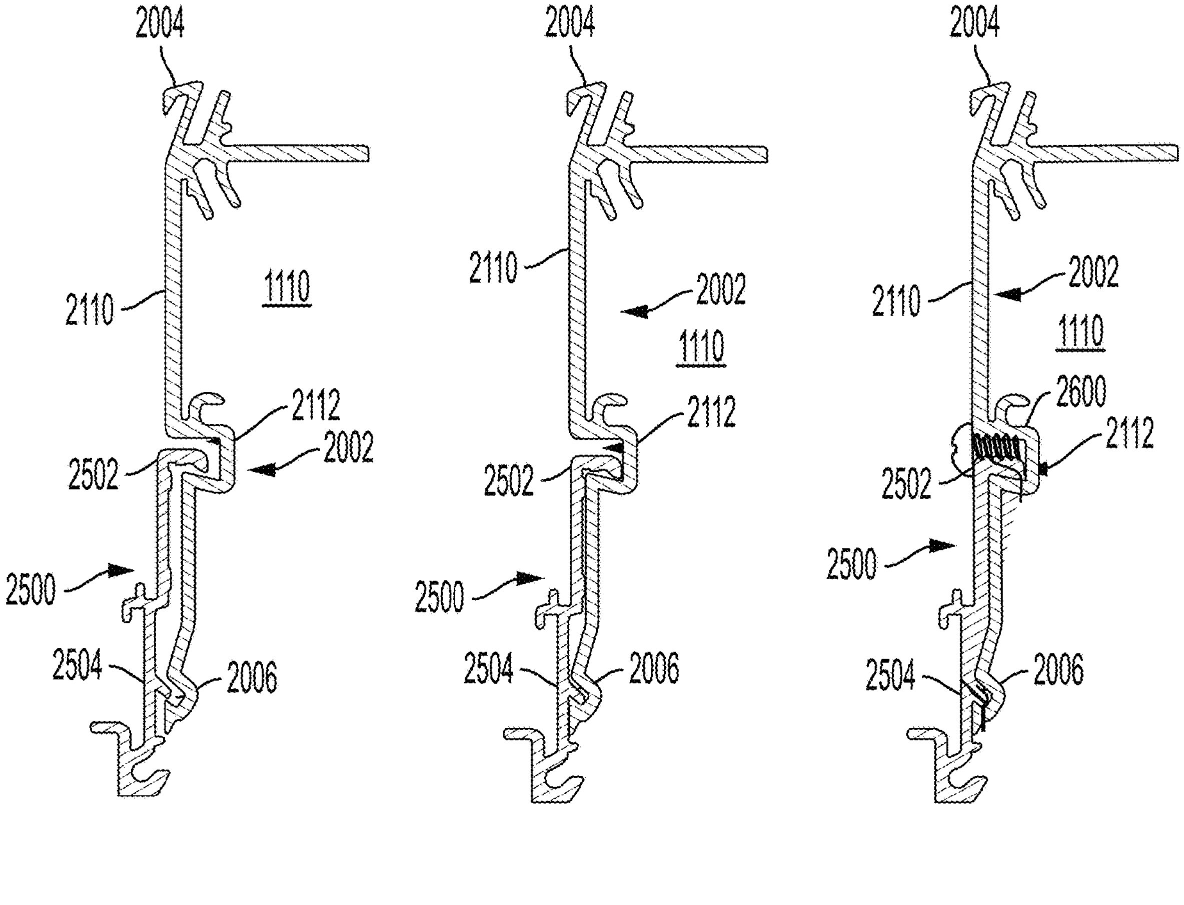
FIGS. 13-15C show various implementations of partial cross-sections of housing and housing trim configurations in accordance with the subject disclosure.
Figure 14:
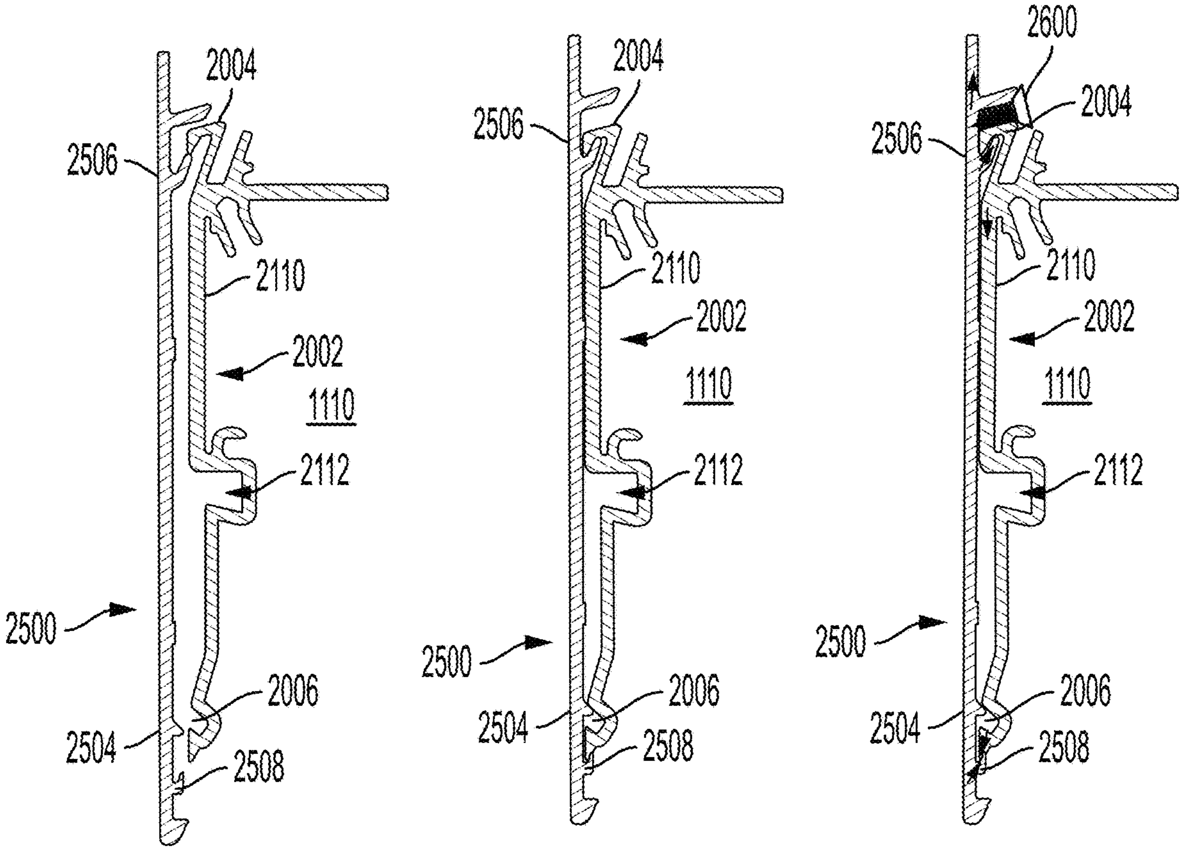

Referring now to FIGS. 13-14, shown are various implementations of partial cross-sections of housing 2002 and housing trim 2500 configurations. In general, the housing 2002 as described with reference to FIGS. 13-14 follows the same principles as housing embodiments described above to be employed in linear lighting systems.

The housing 2002 of FIGS. 13-14, as opposed to housing implementations described above, defines a catch 2004 for clasping to the housing trims 2500. Additionally, the sidewalls 2110 of the housing 2002, while still defining a housing cavity 1110 providing a lighting environment for reflection and projection of light rays in a desired format and direction, defines an inward alcove 2112. See for example FIG. 6 versus FIG. 13. The alcove 2112 serves to receive a portion of the housing trim 2500 for joining thereto. For example, as shown in FIG. 13, the inward alcove 2112 depicted serves as a screw boss for attachment to the housing trim 2500.

The housing 2002 further differs from previous housing implementations described herein through defining a trim inlet 2006. The trim inlet 2006, similar to the inward alcove 2112, serves as receiving nook for joining with the housing trim 2500. As such, each of the catch 2004, inward alcove 2112, and trim inlet 2006 functions to interface with the housing trim 2500.

Various deployments of the housing trim 2500 can be realized for association with the housing 2002 described in FIGS. 13-14. In general, the housing trim 2500 is complimentary to the housing 2002, embodying a similar relative silhouette thereto and extending into the page of FIGS. 13-15C. Each housing trim 2500 contemplated herein varies in size, shape, and functionality, and in turn, several further embodiments of the housing trim 2500 may be anticipated by the subject technology although not specifically enumerated herein.

FIG. 13 exemplifies a housing trim 2500 with an elevated linking feature 2502 for insertion into the inward alcove 2112, and an intermediate rib 2504 for insertion into the trim inlet 2006. A screw 2600 can then driven into the inward alcove 2112, driving the elevated linking feature 2502 to pressure the inward alcove 2112 along a surface of the elevated linking feature 2502 opposite the screw 2600. By nature of the angled architecture of the intermediate rib 2504 defined by the housing trim 2500, it too is pressured into the trim inlet 2006, thus ensuring snug contact with the housing 2002.

FIG. 14 exemplifies a housing trim 2500 with a crest coupling feature 2506 for insertion into the catch 2004 of the housing 2002. In this regard, the crest coupling feature 2506 wraps around the catch 2004 while leaving room for insertion of a screw 2600 to be driven between the crest coupling feature 2506 and the catch 2004, driving the crest coupling feature 2506 further into the structure of the catch 2004, and by virtue, coupling the housing 2002 and housing trim 2500. The housing trim 2500 similarly incorporates an intermediate rib 2504 for insertion into the trim inlet 2006, and a foot rest 2508, to halt downward pressure of the housing 2002 produced by the screw 2600 insertion.

Figure 15A:
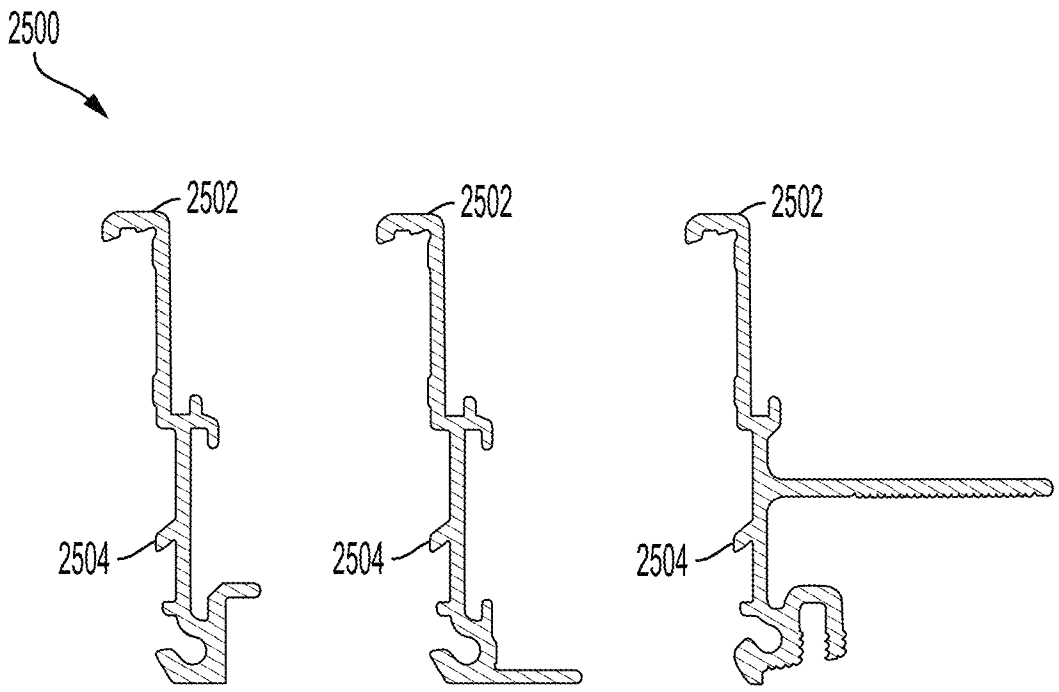
Figure 15B:
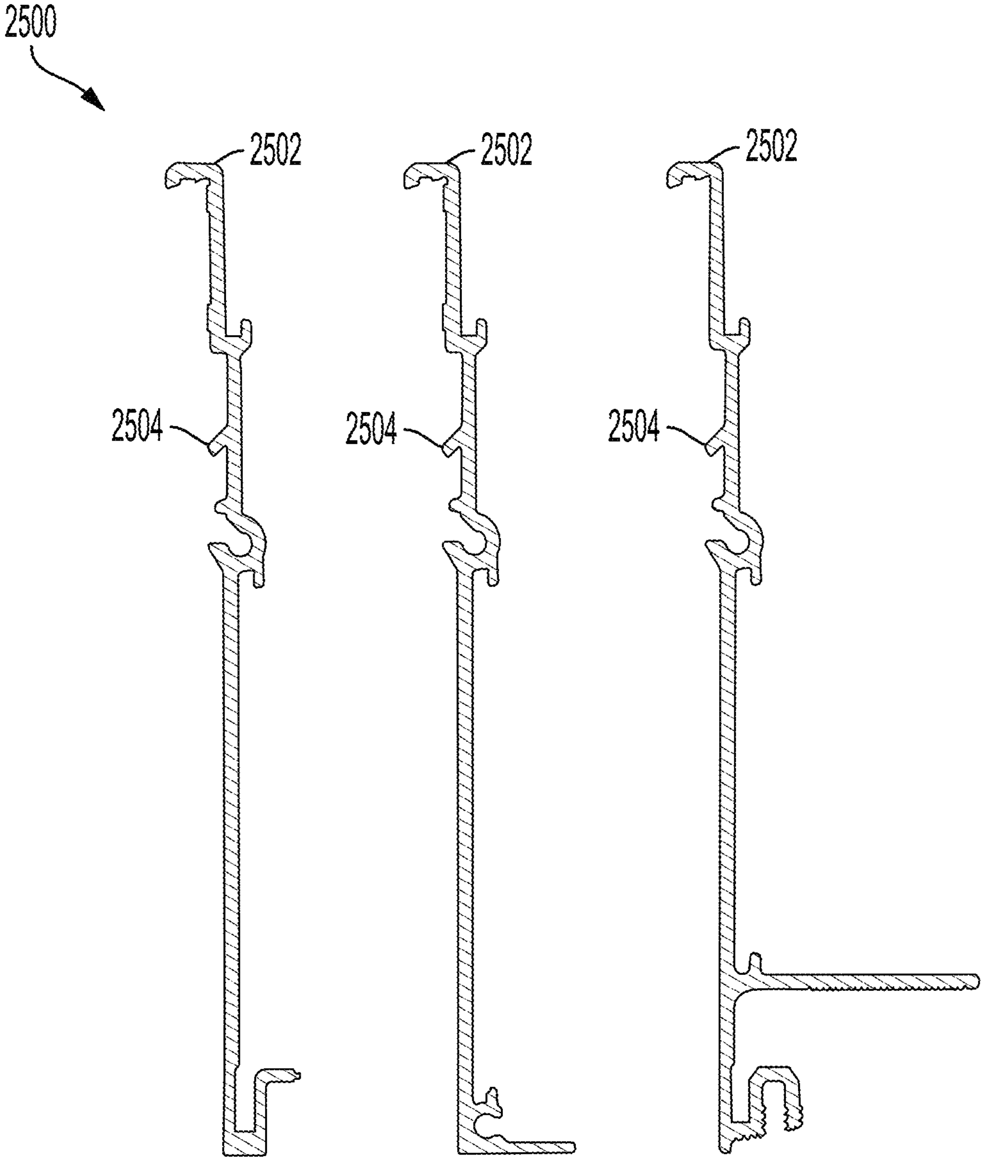
Figure 15C:
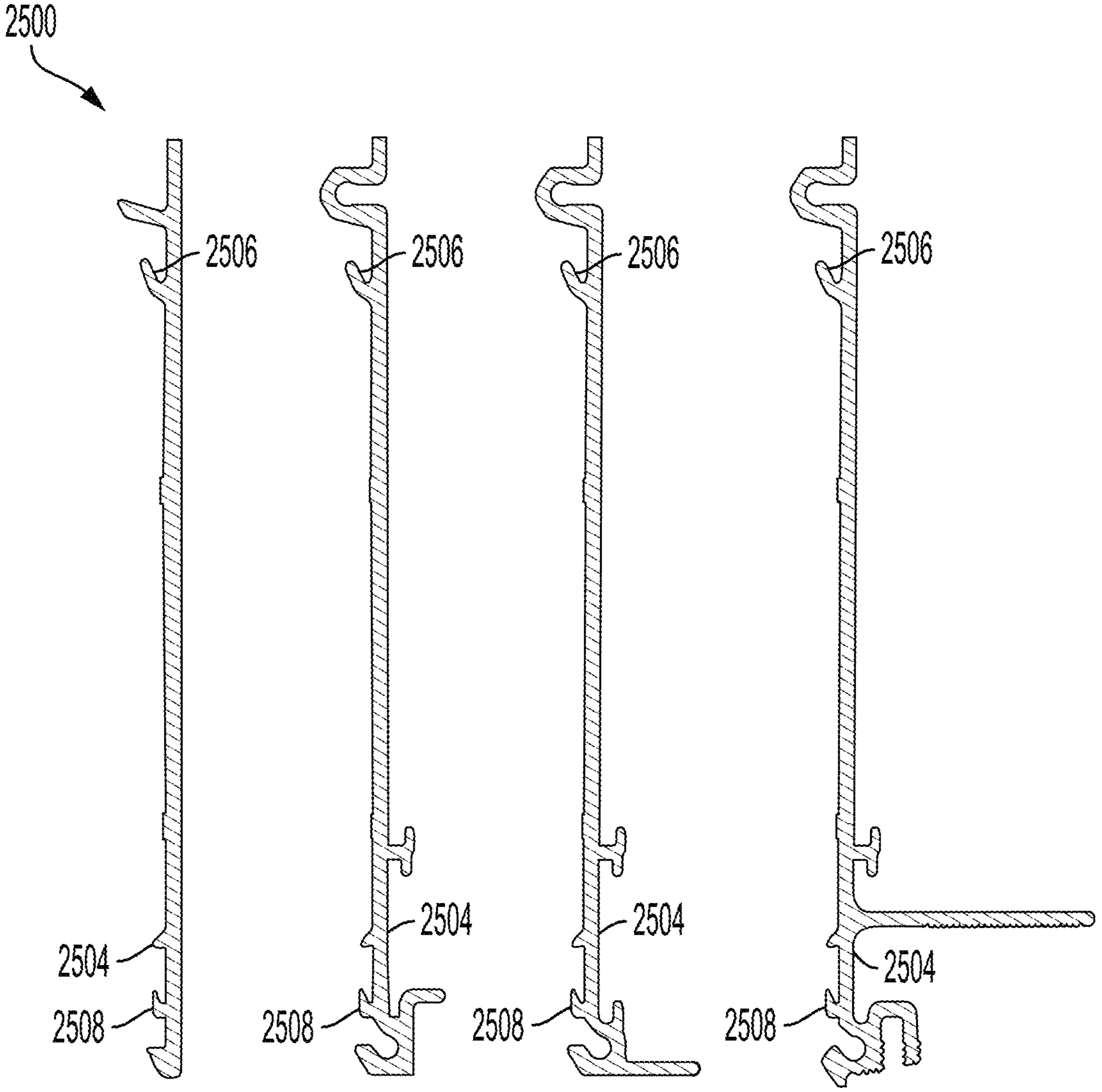

FIG. 15A further exemplifies housing trims 2500 with an elevated linking feature 2502 and an intermediate rib 2504, though with differing and additional ornamental and functional features. FIG. 15B further exemplifies housing trims 2500 with an elevated linking feature 2502 and an intermediate rib 2504, though larger in length than the housing trims 2500 of FIG. 15A. Lastly, FIG. 15C exemplifies housing trims 2500 with a crest coupling feature 2506, an intermediate rib 2504, and a foot rest 2508. It should be understood by one having ordinary skill in the art that implementations of housing trims 2500 may have any further combination of an elevated linking feature 2502, intermediate rib 2504, crest coupling feature 2506, and foot rest 2508 in order to create proximate connection with a housing 2002.

It will be appreciated by those of ordinary skill in the pertinent art that the functions of several elements can, in alternative embodiments, be carried out by fewer elements, or a single element. Similarly, in some embodiments, any functional element can perform fewer, or different, operations than those described with respect to the illustrated embodiment. Also, functional elements (e.g., check valves, valve elements, spring retention assemblies, and the like) shown as distinct for purposes of illustration can be incorporated within other functional elements in a particular embodiment.

While the subject technology has been described with respect to various embodiments, those skilled in the art will readily appreciate that various changes and/or modifications can be made to the subject technology without departing from the scope of the present disclosure.

What is claimed is:

1. A lighting system comprising:

a housing defining a cavity, the housing having catches protruding into the cavity;

a direct reflector positioned in the cavity and having a first and second branch, the first and second branches configured to snap into the catches of the housing;

a lens configured to snap into the first and second branch; and an LED printed circuit board positioned between the branches wherein the first and second branches each define;

a finger extending from the branch at a branch intersection and bending at a finger joint; and a bent shank also extending from the branch intersection, the bent shank extending along a neck portion and bending at a shoulder to form a nook, the first and second branches configured to snap into the catches of the housing between the finger joint and the shoulder of the bent shank.

2. The lighting system of claim 1, further comprising an indirect reflector connected to the housing.

3. The lighting system of claim 1, wherein a surface of the LED printed circuit board contacts the direct reflector and dissipates heat to the direct reflector, the direct reflector dissipating heat to the housing.

4. The lighting system of claim 1, wherein the lighting system further comprises an unlatch leaver, the unlatch leaver affixed to the direct reflector and configured to pivot and consequently urge the direct reflector away from the housing catches to unsnap the direct reflector from the housing.

5. The lighting system of claim 1, further comprising a housing trim connected to an exterior surface of the housing.

6. A lighting system comprising:

a housing defining a cavity;

a direct reflector positioned in the cavity and configured to connect to the housing, the direct reflector having a first and second branch, the direct reflector defining at least one screw channel, the direct reflector also defining an elongated slot between the first and second branch;

a lens configured to connect to the direct reflector; and an LED printed circuit board configured to slide into the elongated slot, wherein the LED printed circuit board is screwed to the direct reflector at an angle via the screw channel urging the LED printed circuit board into the elongated slot.

7. The lighting system of claim 6, further comprising an indirect reflector connected to the housing.

8. The lighting system of claim 6, wherein the first and second branches each define:

a finger extending from the branch at a branch intersection and bending at a finger joint; and a bent shank also extending from the branch intersection, the bent shank extending along a neck portion and bending at a shoulder to form a nook, the first and second branches configured to snap into the housing between the finger joint and the shoulder of the bent shank.

9. The lighting system of claim 6, wherein the first and second branches each define:

a finger extending from the branch at a branch intersection and bending at a finger joint; and a saddle hook, the first and second branches configured to snap into the housing between the finger joint and the saddle hook.

10. The lighting system of claim 6, wherein the lighting system further comprises an unlatch leaver, the unlatch leaver affixed to the direct reflector and configured to pivot and consequently urge the direct reflector away from the housing to disassociate the direct reflector from the housing.

11. The lighting system of claim 6, further comprising a housing trim connected to an exterior surface of the housing.

12. The lighting system of claim 6, wherein a surface of the LED printed circuit board contacts the direct reflector and dissipates heat to the direct reflector, the direct reflector dissipating heat to the housing.

13. A lighting system comprising:

a housing defining a cavity, the housing having catches protruding into the cavity;

a housing adapter positioned in the cavity and having a first and second branch, the first and second branches configured to snap into the catches of the housing; and a light fixture configured to connect to the housing adapter, wherein the housing adapter defines the first and second branches, the first and second branches of the housing adapter each defining a handle and a jutting outward leg forming an external surface connection hollow for snap connection to the catches of the housing.

14. A lighting system comprising:

a housing defining a cavity, the housing having catches protruding into the cavity;

a direct reflector positioned in the cavity and having a first and second branch, the first and second branches configured to snap into the catches of the housing;

a lens configured to snap into the first and second branch; and an LED printed circuit board positioned between the branches, wherein the first and second branches each define;

a finger extending from the branch at a branch intersection and bending at a finger joint; and a saddle hook, the first and second branches configured to snap into the catches of the housing between the finger joint and the saddle hook.

15. The lighting system of claim 14, further comprising an indirect reflector connected to the housing.

16. The lighting system of claim 14, wherein a surface of the LED printed circuit board contacts the direct reflector and dissipates heat to the direct reflector, the direct reflector dissipating heat to the housing.

17. The lighting system of claim 14, wherein the lighting system further comprises an unlatch leaver, the unlatch leaver affixed to the direct reflector and configured to pivot and consequently urge the direct reflector away from the housing catches to unsnap the direct reflector from the housing.

18. The lighting system of claim 14, further comprising a housing trim connected to an exterior surface of the housing.

19. A lighting system comprising:

a housing defining a cavity;

a direct reflector positioned in the cavity and having a first and second branch, the first and second branches configured to snap into the housing;

a lens configured to snap into the first and second branch; and an LED printed circuit board positioned between the branches, wherein the lighting system further comprises an unlatch leaver, the unlatch leaver affixed to the direct reflector and configured to pivot and consequently urge the direct reflector away from the housing to unsnap the direct reflector from the housing.

* * * * *